(12) United States Patent
Rieser et al.

(10) Patent No.: US 12,507,928 B2
(45) Date of Patent: Dec. 30, 2025

(54) ADAPTIVE COGNITIVE ANALYTICS PLATFORM

(71) Applicant: The MITRE Corporation, McLean, VA (US)

(72) Inventors: Cj Rieser, Charlottesville, VA (US); Robyn J. Wade, Hamilton, VA (US); David Michael Slater, Herndon, VA (US); Steven Guan, Fairfax, VA (US); Haoyang Haven Liu, Burke, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 17/098,164

(22) Filed: Nov. 13, 2020

(65) Prior Publication Data

US 2021/0177327 A1    Jun. 17, 2021

Related U.S. Application Data

(60) Provisional application No. 62/934,721, filed on Nov. 13, 2019.

(51) Int. Cl.
*A61B 5/00* (2006.01)
*A61B 5/024* (2006.01)
*A61B 5/16* (2006.01)
*G16H 50/20* (2018.01)

(52) U.S. Cl.
CPC ............ *A61B 5/165* (2013.01); *A61B 5/0006* (2013.01); *A61B 5/02405* (2013.01); *G16H 50/20* (2018.01)

(58) Field of Classification Search
None
See application file for complete search history.

(56) References Cited

U.S. PATENT DOCUMENTS

| | | | |
|---|---|---|---|
| 2002/0165443 A1* | 11/2002 | Mori | A61B 5/0002 600/407 |
| 2008/0033303 A1* | 2/2008 | Wariar | A61B 5/02028 600/483 |
| 2013/0317753 A1* | 11/2013 | Kamen | A61B 5/11 702/19 |
| 2016/0073947 A1* | 3/2016 | Anderson | A61B 5/7282 600/301 |
| 2017/0109437 A1* | 4/2017 | Kudo | G06F 16/35 |
| 2021/0007667 A1* | 1/2021 | Thaveeprungsriporn | A61B 5/4884 |

\* cited by examiner

*Primary Examiner* — Sana Sahand
(74) *Attorney, Agent, or Firm* — Morrison & Foerster LLP

(57) ABSTRACT

Described are methods and systems to provide an adaptive cognitive analytics platform to a user such that the user's data remains secure while enabling functionality adaptive to the user's needs. In some embodiments, a cognitive analytics application can be installed on the user's mobile device to analyze a plurality of data streams generated by sensors worn by the user. The cognitive analytics application is configured to allow the user to select and download one or more analytics programs from a plurality of vetted analytics programs depending on the user's desired functionality. The cognitive analytics application can be configured to determine the types of analytics program usable by the user based on the data streams available at the user's mobile device. To secure user data and protect the user's data privacy, the cognitive analytics application can prevent the plurality of analytics programs from transmitting monitored physiological data.

18 Claims, 10 Drawing Sheets

ADAPTIVE COGNITIVE ANALYTICS PLATFORM

CROSS-REFERENCE TO RELATED APPLICATIONS

This application claims the priority of U.S. Provisional Application No. 62/934,721, filed Nov. 13, 2019, which is related to U.S. patent application Ser. No. 16/214,759, filed on Dec. 10, 2018, entire contents of each of which are incorporated herein by reference.

FIELD OF THE DISCLOSURE

This disclosure relates generally to system and methods for providing an adaptive cognitive analytics platform.

BACKGROUND OF THE DISCLOSURE

Currently, a plethora of wearable devices are available for users to monitor their health. For example, the popular FITBIT device can be used by a user to estimate the number of steps the user takes during the day as well as to track the user's restlessness at night to better understand the user's sleep quality. While such devices may be useful to track one or two specific health conditions, these wearable devices usually have limited sensors, which limits the complexity in health analysis. Also, these wearable devices can only provide built-in functionality.

Additionally, these wearable devices usually port their collected user data to cloud servers, which are capable of performing analysis on the user's data. This transmission and offloaded storage of the user's data exposes the user's private data to malicious entities and is a security risk that must be protected against.

SUMMARY OF THE DISCLOSURE

There is a need for methods and systems to provide an adaptive cognitive analytics platform to a user such that the user's data remains secure while enabling functionality adaptive to the user's needs. In some embodiments, a cognitive analytics application can be installed on the user's mobile device to analyze a plurality of data streams generated by one or more sensors worn by the user. The cognitive analytics application may be configured to allow the user to select and download one or more analytics programs from a plurality of vetted analytics programs depending on the user's desired functionality. In some embodiments, to provide extended functionality to the user, cognitive analytics application can be configured to determine the types of analytics program that the user can utilize based on the data streams available at the user's mobile device. Additionally, to better secure user data and protect the user's data privacy, the plurality of analytics programs can be vetted to prevent the cognitive analytics application from transmitting monitored physiological data, according to some embodiments.

In some embodiments, a downloaded analytics program can provide a desired functionality by operating on user data collected from a plurality of wearable sensors communicatively connected to the user's mobile device in a personal area network (PAN). The extended functionality provided by cognitive analytics application may arise not only from the capability to download user-desired analytics programs, but also from the extended types of data provided by the plurality of wearable sensors.

In some embodiments, the cognitive analytics application can be configured to communicate collected data streams with other systems such as an analytics system or other cognitive analytics applications. The increased types and amounts of the data streams available to the user's mobile device, however, may require high bandwidth. Such high bandwidths may reduce data transmission reliability between the cognitive analytics application and other systems as well as reduce the memory storage and battery life of the wearable devices and the user's mobile device. In some embodiments, to combat the disadvantages introduced by increasing the number of wearable sensors and related data streams, the cognitive analytics application can be configured to adaptively reconfigure priorities and transmission rates of the data streams based on analysis of active analytics programs as well as a network connectivity. Reconfiguration may include assigning priorities to each data stream, which may include assigning a data transmission rate to each data stream.

BRIEF DESCRIPTIONS OF THE FIGURES

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION OF THE DISCLOSURE

Described herein are systems and methods for providing an adaptive cognitive analytics platform to a user. In some embodiments, a cognitive analytics application can be installed on the user's mobile device to analyze a plurality of data streams generated by one or more sensors worn by the user. For example, the data streams may include physiological data of the user. The cognitive analytics application may be configured to download one or more analytics programs from a plurality of vetted analytics programs. In some embodiments, to protect the user's data privacy, the plurality of analytics programs can be vetted to prevent the cognitive analytics application from transmitting monitored physiological data. In some embodiments, the cognitive analytics application can be configured to store the one or more data streams on the mobile device and prevent the one or more stored data streams from being transmitted outside of mobile device. For example, in some embodiments, the cognitive analytics application can convert and store the plurality of data streams as a plurality of name data networking (NDN) messages that characterizes the type of data streams without including the actual data values. In these embodiments, the plurality of NDN messages may be transmitted outside of the mobile device to enable adaptive analytics. According to the mechanism described above, the user's personal data remains on the user's mobile device and is not exposed to an external network such as the Internet.

Figure 1:
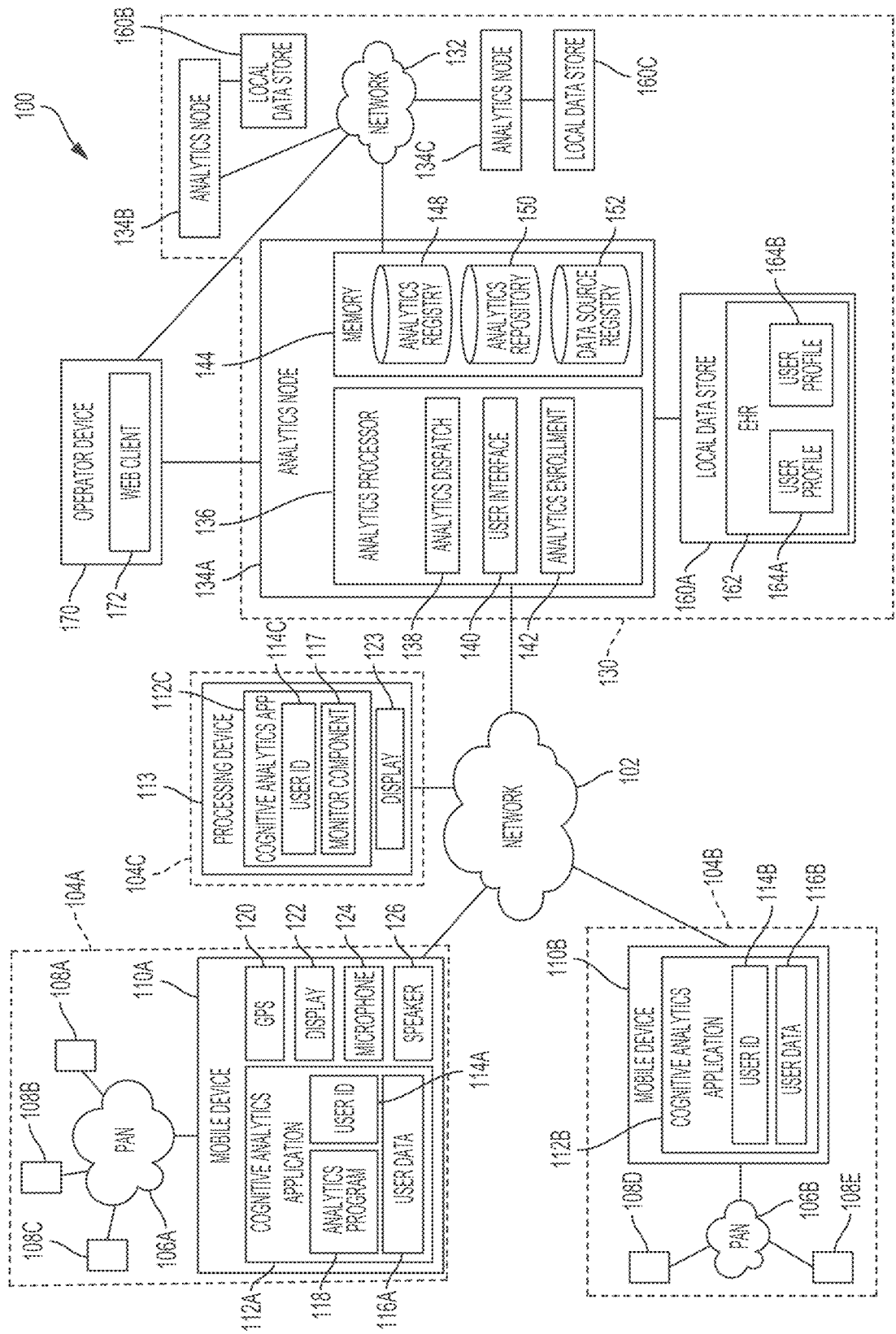
FIG. 1 illustrates a system for providing an adaptive cognitive analytics platform to a user, according to some embodiments.

FIG. 1 illustrates a system 100 for providing an adaptive cognitive analytics platform to a user, according to some embodiments. System 100 includes mobile device 110A, mobile device 110B, and processing device 113 operated by respective users 104A-C. To provide users 104A-C with selectable cognitive analytics, mobile devices 110A-B and processing device 113 can be configured to communicate with analytics system 130 via network 102. In some embodiments, network 102 may include WiFi, a local area network (LAN), a wide area network (WAN), the Internet, a Wi-Fi network, a WiMAX network, a cellular network (e.g., 3G, 4G, 4G Long Term Evolution (LTE)), or a combination thereof. Further, network 102 may implement one or more wired and/or wireless standards or protocols.

In some embodiments, each of on-body sensors 108A-E can be a device that is carried, worn, held, or associated with one of users 104A-B. In some embodiments, user 104A can operate a mobile device 110A that forms a personal area network (PAN) 106A with one or more on-body sensors 108A-C. PAN 106A can be formed based on one or more communication protocols such as WiFi, Thread, Bluetooth, Bluetooth Low Energy (BLE), Bluetooth mesh networking, HaLow, ANT, Zigbee, or the like. Similarly, user 104B may operate mobile device 110B that forms PAN 106B with one or more on-body sensors 108C-D. In some embodiments, mobile devices 110A-B can be communication devices such as mobile phones capable of providing PAN 106A-B and accessing network 102.

In some embodiments, each of on-body sensors 108A-C can be configured to detect and monitor one or more physiological states of user 104A. On-body sensors 108A-C can be configured to transmit monitored physiological data corresponding to the monitored state to mobile device 110A via a short-distance wireless protocol such as Bluetooth, ANT, or Zigbee. For example, on-body sensors 108A-E may include electroencephalography EOG/EEG sensor placed on or near the forehead, ECG sensors placed on or over the chest, respiration sensor, pulse rate sensor placed on or near the wrists, etc. In some embodiments, the short-distance wireless protocols may enable a limited amount of network bandwidth for transmitting physiological or cognitive data. In some embodiments, on-body sensors 108A-C can include an environmental sensor configured to detect a temperature, a light level, a noise level, or a presence of a toxic substance.

In some embodiments, the environmental sensor can include a light sensor, a biosensor, a microphone, or a temperature sensor.

In some embodiments, to enable various cognitive analytics to be performed at mobile device 110A, mobile device 110A can be configured to download cognitive analytics application 112A. Mobile device 110A may include Global Positioning System (GPS) module 120, display 122, microphone 124, and speakers 126.

In some embodiment, cognitive analytics application 112A can include user ID 114A and one or more analytics programs 118 downloaded from system 130. In some embodiments, user ID 114A may be a username or a name of the user or a device identifier of mobile device 110A and associated with the user. In some embodiment, cognitive analytics application 112A can be configured to store user data 116A received from one or more on-body sensors 108A-C or generated by mobile device 110A. User data 116A may include physiological data, cognitive test data, or cognitive survey data. For example, data streams generated by mobile device 110A may include GPS coordinates, captured video, ambient sounds, or spoken commands of the user.

In some embodiments, cognitive analytics application 112A can be configured to store user-derived data in user data 116A in a plurality of data streams, each having an assigned priority. In some embodiments where cognitive analytics application 112A is configured to communicate user data 116 A with a remote system (e.g., another mobile device 104B, a processing device 113, or analytics system 130), cognitive analytics application 112A can be configured to generate a data portfolio including portions of data from user data 116A based on the assigned priorities and a network connectivity to the remote system. For example, when network 102 is overloaded or sparse, cognitive analytics application 112A may be restricted in a data transmission rate to the remote system. In such an example, the data portfolio may include higher priority data types such as vitals data as opposed to gait information, which may be assigned a lower priority level. By generating and transmitting the data portfolio, even during poor network connectivity, the remote system may retain access to higher priority user data to perform necessary analytics or monitoring, according to some embodiments.

In some embodiments, to preserve user data privacy and security, cognitive analytics application 112A can be configured to user data 116A as NDN messages that do not include the underlying user data values. Instead, an NDN message for a user datum includes information that specifies the type of user datum and characteristics of the user datum (e.g., a timestamp, a capture location, a device that originated the user datum, etc.), as will be further described below with respect to FIGS. 6-8. In some embodiments, by transmitting these NDN messages to the remote system, cognitive analytics application 112A may notify the remote system of the types of available data streams, rate of data stream capture, and/or a user location of mobile devices 110A. This type of user data metadata may enable the remote system to discover and recommend analytics that can be executed by mobile device 110A.

In some embodiments, like mobile device 110A, processing device 113 can be configured to implement cognitive application 114C including, for example, user ID 114C and display 123. In some embodiments, processing device 113 can be a mobile device such as mobile device 110A or a desktop computer, a workstation, a server, and the like. In some embodiment, cognitive analytics application 112C can include monitor component 117, which may be an example of analytics program 118 downloaded from analytics system 130.

In some embodiments, monitor component 117 can be configured to offload analytics processing from, one or more of mobile devices 110A-B. In these embodiments, cognitive analytics application 112C can receive a data portfolio from, for example, cognitive analytics application 112A where the data portfolio includes portions of data streams captured and stored in user data 116A. Instead of running analytics program 118 to process user data 116A, monitor component 117 can be configured to identify analytics program 118 needed to process the data portfolio and execute the identified analytics program 118 on processing device 113, according to some embodiments. Then, cognitive analytics application 112C may transmit analytics results to mobile device 110A that originated the data portfolio.

In some embodiments, monitor component 117 can be configured to execute one or more analytics programs that compare analytics results associated with two or more cognitive analytics applications 112A-B of two more users 104A-B. For example, both cognitive analytics applications 112A-B may be a health status monitor configured to provide a health level of a user based on data streams such as vitals data (e.g., heart rate, breathing rate, or body temperature) and cognitive test results (e.g., a cognitive test to detect a user response rate). In some embodiments, display 123 can be configured to display the analysis results (e.g., health statuses) for two or more users 104A-B to enable user 104C to monitor cognitive conditions of each of users 104A-B. Such an application may be useful in monitoring personnel health during a military operation, where display 123 enables user 104C to easily assess cognitive or health conditions of users 104A-B.

In some embodiments, analytics system 130 includes a plurality of analytics nodes 134A-C connected to network 132. Network 132 may represent a portion of network 102 or can be a separate network. One or more of analytics nodes 134A-C can be configured to manage one or more respective local data stores 160A-C. In some embodiments, the components of analytics system 130 are described with respect to U.S. Provisional Application Nos. 62/599,309 and 62/620,944, each of which is incorporated herein by reference. The functionality of these components are further described and summarized below.

In some embodiments, local data store 160A may include an Electronic Health Record (EHR) 162 including health information of users 104A-B. For example, health information of users 104A-B may be stored as respective user profiles 164A-B in EHR 162. In some embodiments, analytics program 118 can be configured to interface with EHR 162 to enable different types of cognitive analytics to be performed.

In some embodiments, analytics node 134A includes analytics processor 136 and memory 144. Memory 144 can include analytics registry 148, analytics repository 150, and data source registry 152. In some embodiments, analytics repository 150 can be configured to store a plurality of analytics programs that operates on health-related information gathered at mobile devices 110A-B. In some embodiments, analytics registry 148 may include information identifying a plurality of downloadable analytics programs such as those stored in analytics repository 150. The information may specify where an analytics program is stored such as in analytics repository 150 or in one or more analytics repositories of other analytics nodes 134B-C. In some embodiments, data source registry 152 can be configured to store information identifying the types of data stored in local data store 160A. For example, data source registry 152 may indicate that EHR 162 is stored in local data store 160A. In some embodiments, by maintaining data source registry 152, analytics node 134A can be configured to manage external requests to access local data store 160A as well as to notify external systems of the existence of specific stored data.

In some embodiments, analytics processor 136 can include analytics dispatch 138, user interface 140, and analytics enrollment 142. As described with respect to U.S. Non-provisional application Ser. No. 16/214,759, analytics enrollment 142 allows authorized user to generate and upload analytics programs for storage in analytics repository 150, according to some embodiments. In some embodiments, analytics dispatch 138 can be configured to generate analytics requests from a user, from one of mobile devices 110A-C, or from other analytics nodes 134A-C. In some embodiments, user interface 140 allows a user operating operator device 170 to interface with the functions provided by analytics nodes 134A-C. In some embodiments, the user operating operator device 170 can access analytics processor 136 through a web client 172 (e.g., a browser). For example, the user may be a physician or university researcher or other authorized users.

In some embodiments, network 132 can be configured as a named data networking (NDN) where network messages generated by each of analytics node 134A-C can be tagged with a data type (e.g., data stream type 242) or other data identifying information, but not with an identifier of a source of the NDN message (e.g., as being originated from analytics node 134A). In some embodiments, the data type identifying the NDN message may be associated with a priority level to enable analytics nodes 134A-C to selectively retrieve NDN messages during network disruptions or when network 132 is overloaded or is operating under high stress.

Figure 2:
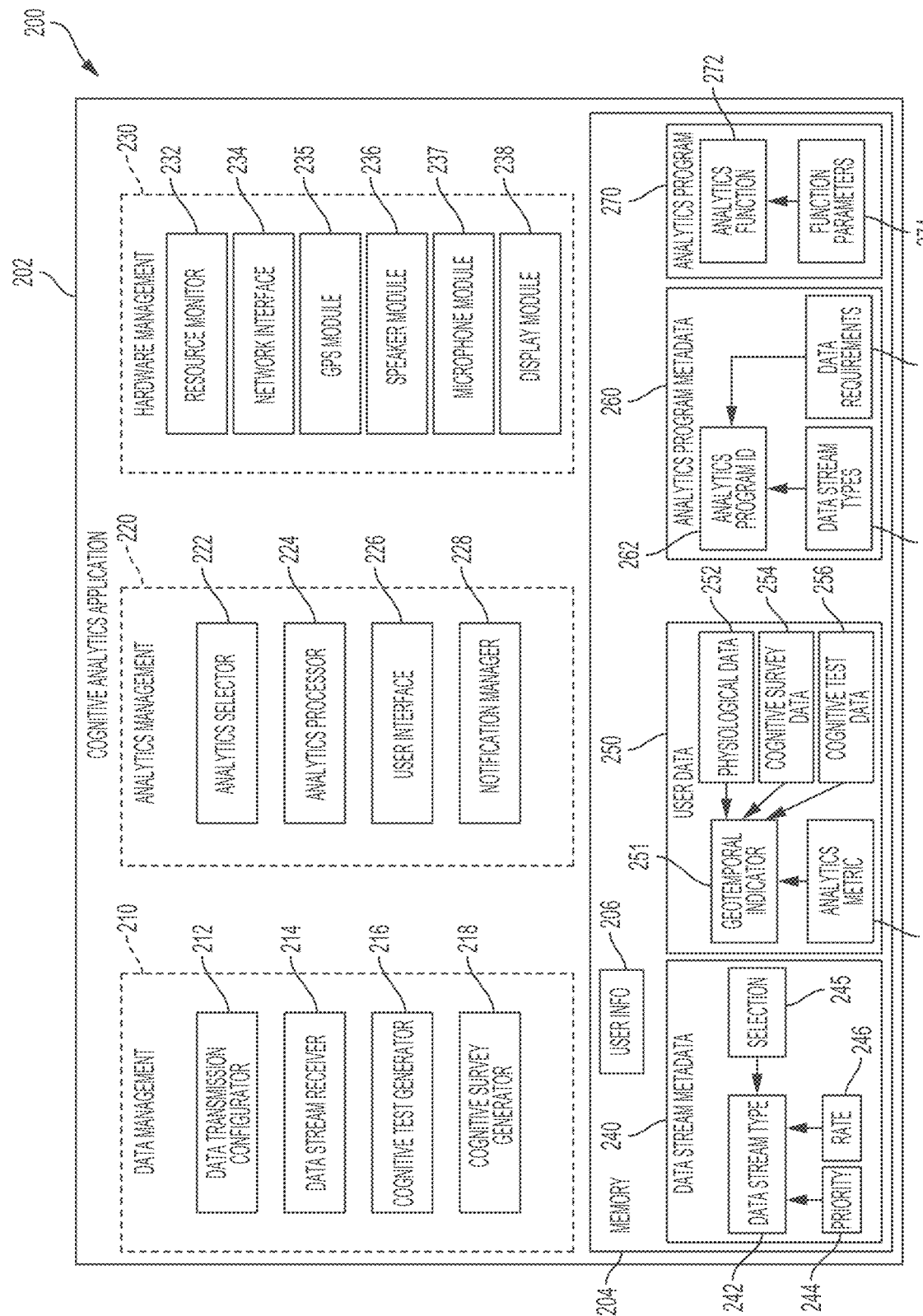
FIG. 2 illustrates a block diagram of a cognitive analytics application, according to some embodiments.

FIG. 2 illustrates a block diagram of cognitive analytics application 202, according to some embodiments. Cognitive analytics application 202 may be an example implementation of cognitive analytics application 112A-B, as described with respect to FIG. 1.

In some embodiments, cognitive analytics application 202 can include memory 204 for storing user information 206, data stream metadata 240, user data 250, analytics program metadata 260, and one or more analytics programs 270.

In some embodiments, user information 206 may include a user ID, contact information associated with the user, or user preferences entered by the user. In some embodiments, user information 206 may include a device ID associated with cognitive analytics application 202.

In some embodiments, data stream metadata 240 can include data stream types 242 accessible by cognitive analytics application 202. Each data stream type 242 may be assigned a priority 244 and be associated with transmission rate 246 and selection 245. For example, a vitals data stream type such as a heartrate or a breathing rate may be assigned a higher priority due to the importance of such physiological data. In some embodiments, rate 246 may include a transmission rate or a storage rate for data stream type 242 that may be assigned based on priority 244. In some embodiments, selection 245 may indicate whether data stream type 242 is currently being used by one or more running analytics programs 270. In some embodiments, if selection 245 for data stream type 242 is disabled, then cognitive analytics application 200 may ignore data streams of data stream type 242 to preserve processing capacity and memory storage.

In some embodiments, data stream metadata 240 enables cognitive analytics application 202 to generate named data networking (NDN) messages for communicating information about user data 250 with a remote system such as an analytics node 134A of analytics system 130 or processing device 113. As will be further described below with respect to FIGS. 6-8, an NDN message may include an assigned data identifier such as data stream type 242 to identify the type of user data contained in NDN message without including the underlying data value.

In some embodiments, user data 250 can include user-derived data such as physiological data 252, cognitive survey data 254, cognitive test data 256, analytics metric 258, or a combination thereof. As will be further described below, this user-derived data may be generated by the mobile device (e.g., mobile device 110A), one or more on-body sensors coupled to the mobile device (e.g., on-body 108A-C), or one or more analytics programs 270. In some embodiments, one or more of physiological data 252, cognitive survey data 254, cognitive test data 256, or analytics metric 258 can be associated with a geotemporal indicator 251. In some embodiments, geotemporal indicator 251 includes data identifying a time and a location at which specific user-derived data was obtained. For example, geotemporal indicator 251 may include a timestamp and a GPS coordinate. In some embodiments, each type of user-derived data stored in user data 250 can be stored in a corresponding data stream. In some embodiments, each data value of user data 250 can be saved as an NDN message, as will be further described below with respect to FIGS. 6-8.

In some embodiments, analytics program metadata 260 can be configured to store one or more analytics programs ID 262 identifying one or more corresponding analytics programs 270 associated with cognitive analytics application 202. In some embodiments, the one or more corresponding analytics programs 270 can be stored in memory 204. Each analytics program ID 262 may be stored in association with data stream types 264 and data requirements 266 to execute the analytics program corresponding to analytics program ID 262. In some embodiments, data stream types 264 may include input data streams required by analytics program 270 corresponding to analytics program ID 262. In some embodiments, data stream types 264 may specify an event type 611 of an NDN message, as will be further described below with respect to FIGS. 6-8. In some embodiments, data requirements 266 may include a timeliness requirement, a priority level, a data rate requirement, or other resource requirements associated with required data stream types 264.

In some embodiments, analytics program 270 can be downloaded from a remote server such as analytics node 134A of FIG. 1. In some embodiments, analytics program 270 can be vetted as being configured to not transmit any user data 250 outside of cognitive analytics application 202. In some embodiments, the capability of the analytics program 270 to transmit user data 250 outside of cognitive analytics application 202 can be selected or configured by the user of cognitive analytics application 202. In some embodiments, analytics program 270 can include one or more function parameters 274 used to configure analytics function 272 for performing cognitive analytics. For example, example parameters that may change how analytics program is to be configured may include, without limitation, a height of the user, a gender of the user, a weight of the user, genetics data of the user, a family history of the user, a health status of the user, current prescriptions associated with the user, or other information stored in an EHR (e.g., EHR 162). In some embodiments, analytics program 270 can be configured to generate function parameters 274 by submitting a query to analytics node 134A based on user info 206.

In some embodiments, cognitive analytics application 202 can be configured to implement various components for data management 210, analytics management 220, and hardware management 230. A component (or module) may include a selection of stored operations that when executed by one or more processors cause the one or more processors to perform the stored operations.

In some embodiments, components for performing hardware management 230 may include resource monitor 232, network interface 234, GPS module 235, speaker module 236, microphone module 237, and display module 238.

In some embodiments, resource monitor 232 can be configured to determine a plurality of data stream types capable of being received by cognitive analytics application 202. In some embodiments, resource monitor 232 can be configured to monitor a plurality of parameters for a network connectivity associated with data stream type 242. For example, resource monitor 232 may monitor the network connectivity to on-body sensor 108A configured to gather heart rate, a specific data stream type. In some embodiments where cognitive analytics application 202 is configured to communicate user data 250 with a remote system (e.g., analytics system 130 or another mobile device 104B-C), resource monitor 232 can be configured to monitor a plurality of parameters for a network connectivity between cognitive analytics application 202 and the remote system. In some embodiments, the plurality of parameters for network connectivity can include a network bandwidth, a packet loss rate, a maximum network bandwidth, network persistence, etc.

In some embodiments, network interface 234 can be configured to interface with one or more networking chips on the mobile device to enable cognitive analytics application 202 to receive user-derived data through one or more communication channels. For example, network interface 234 may interface with user-derived data received through WiFi, Zigbee, AIRNET, etc. In some embodiments, network interface 234 can be configured to interface cognitive analytics application 202 with the remote system such as analytics system 130 or another mobile device (e.g., mobile device 104B) by permitting access to network 102.

In some embodiments, GPS module 235 may interface with a GPS 120 of mobile device 110A to receive GPS information. In some embodiments, the GPS information may include a GPS location (or coordinate), a GPS time captured by GPS 120, or a combination thereof. In some embodiments, cognitive analytics application 202 can be configured to generate geotemporal indicator 251 based on the received GPS information.

In some embodiments, speaker module 236, microphone module 237, and display module 238 can be configured to enable cognitive analytics application 202 to access the functionality of speakers 126, microphone 124, and display 122, respectively. In some embodiments, speaker module 236 and display module 238 can be configured to enable one or more notifications generated by analytics programs 270 to be presented to the user in audio or visual form, respectively. In some embodiments, microphone module 237 can be configured to enable the user to input user-derived data vocally. In these embodiments, microphone data such as a user command may be one type of data stream type 242.

In some embodiments, components for performing data management 210 may include data transmission configurator 212, data stream receiver 214, cognitive test generator 216, and cognitive survey generator 218.

In some embodiments, data transmission configurator 212 can be configured to assign rate 246 and selection 245 to each data stream type 242 based on one or more currently executing analytics programs and based on resources detected by resource monitor 232.

In some embodiments, rate 246 includes a sensor transmission rate that may be configured by data transmission configurator 212 and transmitted to the on-body sensor, e.g., on-body sensor 108A, that originated data of data stream type 242. In some embodiments, rate 246 can be used by the on-body sensor to configure the rate at which use-derived data is detected, stored, or transmitted to cognitive analytics application 202. In some embodiments, these dynamically assigned rate 246 renders PAN 106A an analytics-aware medical network because higher priority data stream types 242, in relation to currently active analytics programs 270, may be allotted greater bandwidth or priority. Accordingly, PAN 106A can be more resistant to limited bandwidth or network connectivity disruption.

In some embodiments where cognitive analytics application 202 is configured to communicate user data 250 with a remote system, data transmission configurator 212 can be configured to generate a data portfolio including portions of user data 250 based on priority 244, selection 245, and resources detected by resource monitor 232. In some embodiments, the data portfolio may include a selection of user data 250 corresponding to selected data stream types 242 where selected user data 250 may be stored in the data portfolio at a rate corresponding to priority 244 or rate 246. For example, selection 245 of disabled for data stream type 242 may indicate that analytics program 270 associated with cognitive analytics application 202 needs to access user data 250 having data stream type 242 to perform analytics function 272. In another example, two data streams may correspond to different data stream types 242 of, for example, vitals and non-vitals. In this example, vitals data streams such as a heartrate may be stored at a higher rate in the data portfolio than non-vitals data streams such as gait information. This difference in data rate storage may be useful during poor network connectivity, as detected by resource monitor 232, such that higher priority user data 250 continues to be successfully transmitted. In some embodiments, data transmission configurator 212 can be configured to transmit the data portfolio to the remote system instead of entire data streams. Therefore, the dynamically generated data portfolio transmitted through the network (e.g., network 102) renders network 102 an analytics-aware medical network because higher priority data stream types 242 may be allotted greater bandwidth or priority during data transmission.

In some embodiments, data transmission configurator 212 can be configured to disable one or more on-body sensors 108A-C based on data stream types 264 or data requirements 266 corresponding to analytics program ID 262 of a currently active analytics program, e.g., analytics program 270.

In some embodiments, data stream receiver 214 can be configured to receive a plurality of data streams from one or more on-body sensors 108A-C or at mobile device 110A. For example, such data streams may include detected data corresponding to one or more of a heart rate, a breathing rate, an acceleration, a posture, a core temperature, an R-R interval, ECG data, a cognitive test, a cognitive survey, or the like. In some embodiments, data stream receiver 214 can be configured to store one or more received data streams as user data 250. Further, data stream receiver 214 may tag each portion of a received data stream with geolocation information, e.g., geotemporal indicator 251. In some embodiments, data stream receiver 214 can be configured to save each data value of user data 250 as an NDN message, as will be further described below with respect to FIGS. 6-8.

In some embodiments, in addition to physiological data 252 that can be detected and monitored by one or more on-body sensors 108A-C and mobile device 110A, mobile device 110A can be configured to interact with user 104A to receive cognitive survey data 254 or cognitive test data 256. In some embodiments, cognitive test generator 216 can be configured to generate a prompt to display a cognitive test to user 104A to assess a cognitive condition of user 104A. For example, cognitive test generator 216 may display a maze on display 122 and the prompt may request user 104A to complete the maze. The time used to complete the maze may be stored as cognitive test data 256 in user data 250. This time may be used to assess a mental state (e.g., fatigue) of user 104A. In some embodiments, cognitive test generator 216 may receive preconfigured cognitive tests from analytics node 134A or retrieve a cognitive test stored in analytics program 270.

In some embodiments, cognitive survey generator 208 can be configured to generate a prompt requesting user 104A to answer a question associated with a cognitive condition of user 104A. In some embodiments, the prompt need not be provided visually and can be provided aurally via speaker module 236. For example, the question may ask user 104A to assess a happiness level, a sleepiness level, a confidence level, etc. Once the input from user 104A is received, cognitive survey generator 208 may be configured to store the received data as cognitive survey data 254.

In some embodiments, components for performing analytics management 220 can include analytics selector 222, analytics processor 224, user interface 226, or notification manager 228.

In some embodiments, analytics selector 222 can be configured to determine a plurality of analytics programs that can be executed by cognitive analytics application 202 based on data stream metadata 240 or NDN messages corresponding to data stream metadata 240. For example, analytics selector 222 may determine that analytics program 270 can be executed because the one or more data stream types 264 required by analytics program 270 are stored or selected in data stream metadata 240. In some embodiments, analytics selector 222 can be configured to transmit a request to analytics node 134A to obtain a list of one or more compatible analytics programs. In some embodiments, the request includes information indicating available data stream types 242 receivable by cognitive analytics application 202. In some embodiments, the request includes user information 206. In some embodiments, analytics node 134A can be configured to generate a plurality of analytics programs to recommend to user 104A based the one or more data stream types 242 or user info 206. For example, analytics processor 136 may query EHR 162 based on the received user info 206 to determine a plurality of health conditions associated with user 104A. Further, analytics processor 136 may select one or more analytics programs that may be relevant to user 104A based on the determined health conditions and the one or more data stream types 242. Accordingly, analytics selector 222 can be configured to enable medical-network-protocol aware analytics.

In some embodiments, analytics processor 224 can be configured to select one or more analytics programs 270 for execution. For example, analytics processor 224 may receive a user's instructions to run one or more analytics programs 270. Additionally, the user's instructions may indicate when to run analytics program 270, a period of time to run analytics program 270, or a recurring time interval to run analytics program 270. Such user instructions may be stored in analytics program metadata 260. Accordingly, analytics processor 224 may track which of stored analytics programs 270 are active at any instance in time.

In some embodiments, user interface 226 can be configured to provide a graphical user interface (GUI) to user 104A to enable user 104A to interact with one or more analytics programs 270, set user preferences, or submit responses to cognitive tests or cognitive surveys. In some embodiments, user interface 226 enables user 110A to connect to analytics node 134A to browse available analytics programs as well as to browse analytics program that can be executed by cognitive analytics application 202 based on receivable data stream types 242.

In some embodiments, notification manager 228 can be configured to provide to user 104A one or more notifications generated by one or more analytics programs 270 being executed by analytics processor 224. For example, notification manager 228 may visually display a generated notification on display 122 via display module 238 or aurally broadcast the generated notification through speakers 126 via requests to speaker module 236. For example, analytics program 270 may include analytics function 272 configured to provide a warning to user 104A if a detected heart rate exceeds a threshold as defined in function parameter 274.

Figure 7:
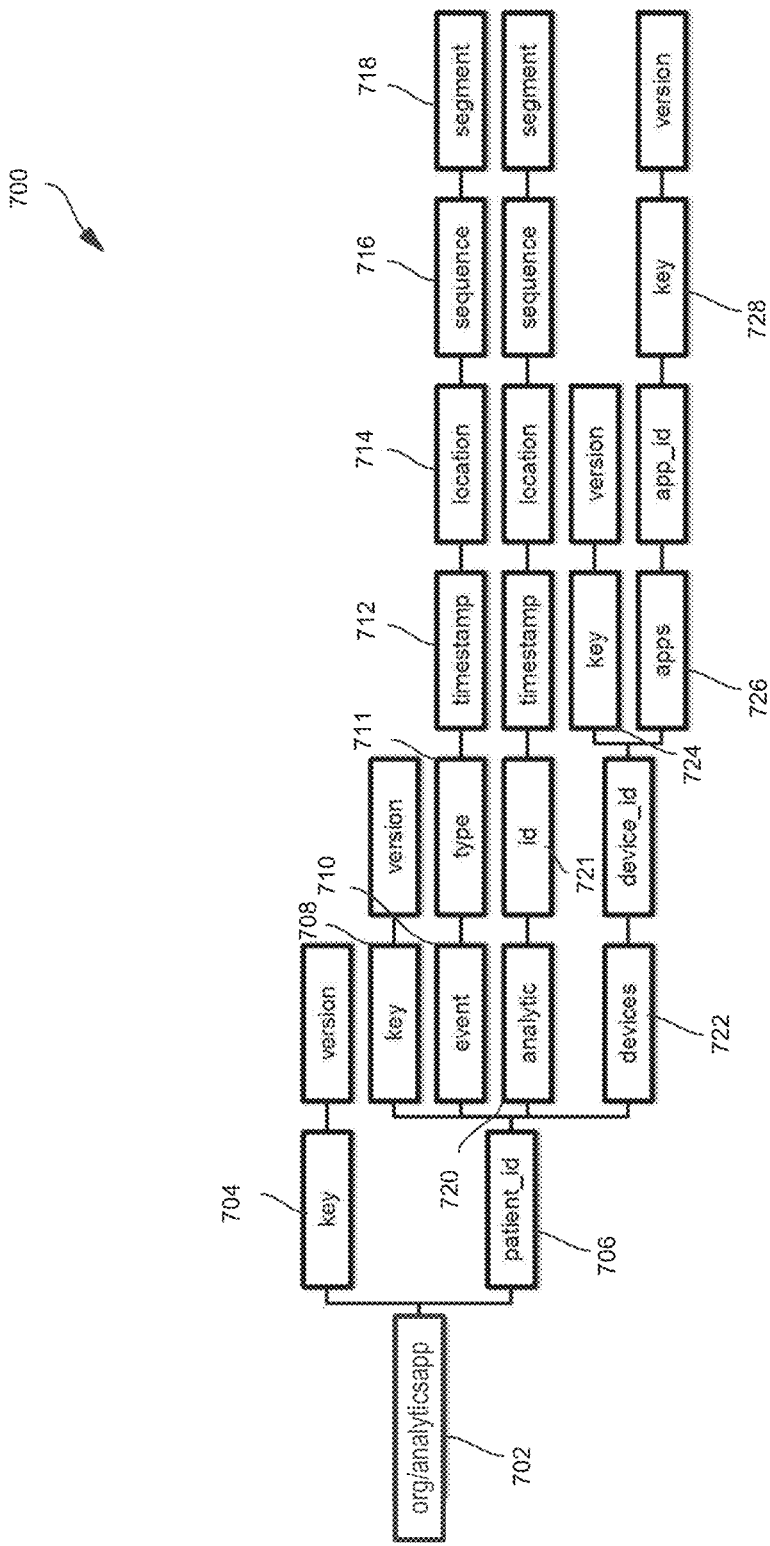
FIG. 7 illustrates a diagram showing a named data networking (NDN) name space applied to user data, according to some embodiments.

FIG. 7 illustrates a diagram showing a named data networking (NDN) name space 700 applied to user data 250, according to some embodiments. In some embodiments, the NDN messages generated by data stream receiver 214 of FIG. 2 to represent user data 250 can comport and be configured to follow NDN name space 700. In some embodiments, NDN name space 700 allows messages transmitted from cognitive analytics application 202 to system 130 to be verified and trusted as well as to enable analytic-aware medical network protocols without sharing data values of user data 250, as will be further described below.

NDN name space 700 shows components of different types of NDN messages that can be generated including components of an NDN message that encapsulates data values (e.g., any of the collected data in user data 250) captured by one or more of on-body sensors 108A-E or mobile device 110A of FIG. 1. In some embodiments, each NDN message can include a root name prefix 702 that represents the ecosystem, i.e., cognitive analytics application 202. One type of NDN message is a root NDN message that includes a root key 704 that can be configured to sign each patient key corresponding to key 708 component of a patient key NDN message. As shown in NDN name space 700, the root NDN message can include a key version for root key 704 to enable key management.

In some embodiments, each user can have one or more unique identifiers as shown in namespace patient_id 706. In some embodiments, patient_id 706 may correspond to user ID 114A of FIG. 1. Each of namespace patient_id 706 has four children key 708, event 710, analytic 720, and devices 722, which correspond to four different types of NDN messages. Since each NDN message transmitted by cognitive analytics application 202 may include patient_id 706, a receiver (e.g., system 130 of FIG. 1) can identify the user and associated user profile corresponding to patient_id 706.

In some embodiments, a patient key NDN message may include a namespace 708 (and an associated version) that can be configured to sign keys of user devices that are authorized to host or generate its data.

In some embodiments, a device NDN message can include a namespace devices 722 including a device_id that specifies a device associated with the user. For example, the user may operate both mobile device 110A and processing device 113 of FIG. 1. In this example, two device NDN messages may include two corresponding, different device IDs to identify mobile device 110A and processing device 113, respectively. In some embodiments, the device NDN message may include a namespace device key 724 (and an associated version) used to sign keys of applications (e.g., analytics programs 270) that are authorized to generate data for the user.

In some embodiments, the device NDN message can include a namespace apps 726 including an app_id that specifies an application (e.g., analytics program 270 or one or more of on-body sensors 108A-E) associated with cognitive analytics application 202. This type of device NDN message may include a namespace key 728 (and associated version) used to sign data values generated by the application corresponding to app_id. For example, for an app_id identifying on-body sensor 108A, key 728 can sign the event data (e.g., a detected heartrate or a breathing rate, a skin temperature, etc.) generated by the device or application corresponding to the app_id.

In some embodiments, the plurality of keys shown in NDN namespace 700 and described above allows any data receiver (e.g., system 130, mobile device 110A, or other devices) receiving an NDN message to verify the received NDN message according to a reconfigured trust schema. Specifically, root key 704 authorizes a user (associated with patient_id 706) by signing user key 708, which authorizes user device by signing device key 724, which authorizes data applications by signing key 724, which sign generated event data.

In some embodiments, an event NDN message has one or more of the following namespaces: event type 711, timestamp 712, location 714, sequence 716, and segment 718. In some embodiments, event type 711 can specifies a type of the event data, which may correspond to data stream type 242. In some embodiments, an event can refer to a data value collected by one of on-body sensors 108A-E. In some embodiments, timestamp 712 can represent when the event occurred—that is, when the data value was collected. In some embodiments, location 714 represents where the event occurred. For example, location 714 may include a location code or a location coordinate (e.g., GPS coordinates). In some embodiments, sequence 716 can include a number to account for low time resolution of data-capture devices (e.g., on-body sensors 108A-E). For example, if the time resolution is in seconds, two or more events may be generated at the same time and would therefore need to be assigned different sequence 716. In some embodiments, sequence 716 is unique to each captured event. In some embodiments, segment 718 can include a number to account for fragmentation when the captured event includes more data than can fit in a single NDN message.

In some embodiments, an analytics NDN message can include namespaces corresponding to an analytics result generated by an analytics program (e.g., analytics program 270) specified by analytic id 721. In some embodiments, the analytics NDN message can include namespace analytic id 721 and the namespaces timestamp, location, sequence, and segment for the generated analytic result. The namespaces of analytics NDN message may correspond to timestamp 712, location 714, sequence 716, and segment 718 of an event NDN message, but specific to the analytics program identified by analytic id 721.

Figure 8:
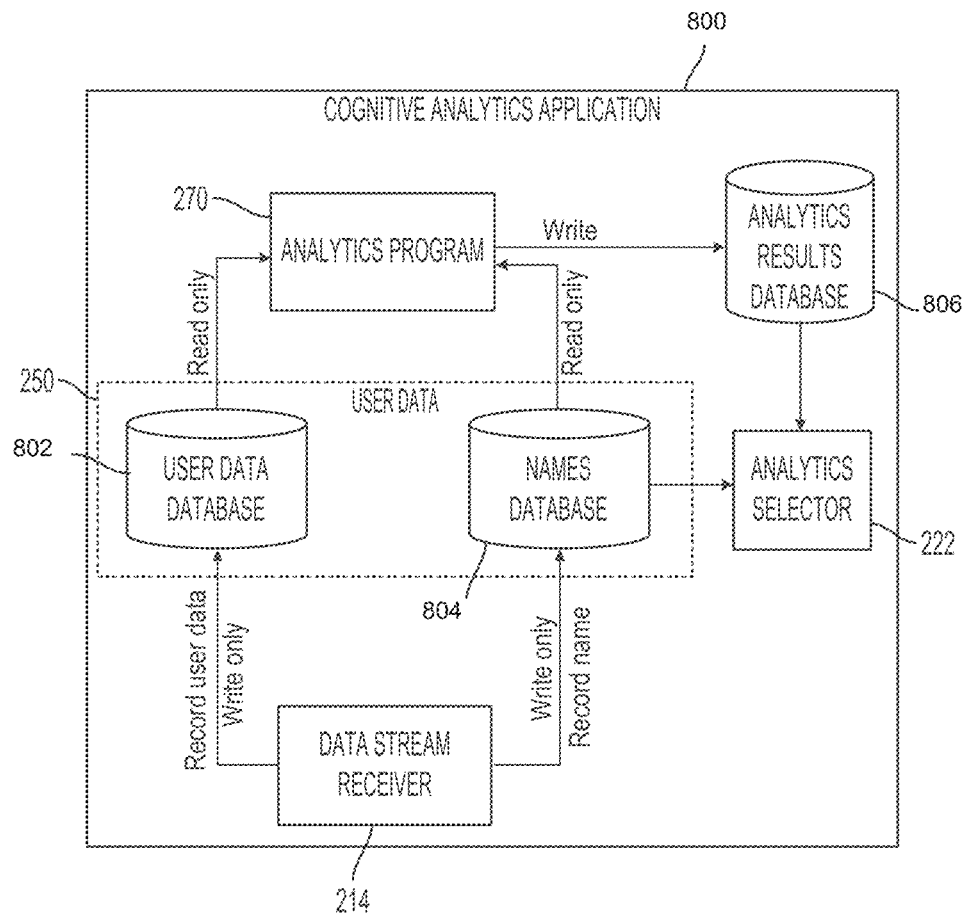
FIG. 8 illustrates a block diagram of a cognitive analytics application adaptive to available data streams, according to some embodiments.

FIG. 8 illustrates a block diagram of a cognitive analytics application 800 adaptive to available data streams, according to some embodiments. In some embodiments, cognitive analytics application 800 may be an example of cognitive analytics application 202 and similarly include user data 250, data stream receiver 214, analytics selector 222, and analytics program 270. As shown in FIG. 8, user data 250 can be stored in readings database 802 and names database 804. For ease of explanation, the following descriptions may refer to one or more components of cognitive analytics application 202, as described above with respect to FIG. 2.

In some embodiments, data stream receiver 214 can be configured to interface with and receive user data collected by one or more on-body sensors 108A-E or generated by one or more data-collection applications (e.g., data received by cognitive test generator 216 or cognitive survey generator 218). In some embodiments, the user data can be received as event data representative of a type of data collected by a device at a specific time. In some embodiments, data stream receiver 214 can be configured to convert a received event datum (including a data value) into an event NDN message and record that event NDN message as an entry in names database 804.

In some embodiments, the event NDN message may include an event type 811 identifying the type of event datum, and timestamp 812, each of which is described above in FIG. 8. The event NDN message may also include location 814, sequence 816, and/or segment 818, each of which is described above in FIG. 8. Accordingly, names database 804 can be configured to store event NDN messages corresponding to event data received at data stream receiver 214 without storing the data values in the event data. In other words, an event NDN message includes metadata of the event data. In some embodiments, by storing event NDN messages, names database 804 represents the types of available data on cognitive analytics application 800.

In some embodiments, data stream receiver 214 can be configured to record the underlying user data (i.e., a raw user data) of the event data in user data database 802. In some embodiments, user data database 802 can be configured to store the underlying user data in association with associated event NDN messages, as will be further described with respect to FIG. 8. For example, a user datum of an event datum may be indexed in user data database 802 according to the event NDN message generated for the vent datum. In some embodiments, data stream receiver 214 can be configured to perform only write operations on user data database 802 and names database 804.

In some embodiments, analytics program 270 can be configured to perform read only operations on user data database 802 and names database 804 to perform its analytics function (e.g., analytics function 272). In some embodiments, analytics program 270 can be configured to issue requests (e.g., a search query) to names database 804 to acquire NDN messages that match data stream types 264 required by an analytics function 272 of analytics program 270. Then, analytics program 270 can issue requests (e.g., search or read query) to user data database 802 to retrieve data values corresponding to acquired NDN messages. Based on the retrieved data values, analytics program 270 may run its analytics function 272 to generate analytics results. In some embodiments, analytics program 270 can be configured to write generated analytics results in analytics results database 806. In some embodiments, a generated analytics result may be stored as an analytics NDN message, as described above with respect to FIG. 8.

For example, analytics program 270 may be a stress assessment application that derives a user's stress level based on a user age ("age"), a heart rate ("HR"), a breathing rate ("BR"), and a heart rate variability ("HRV"), representing four required data types. Based on these four types of data, analytics program 270 may calculate a user condition representing the user's stress level and/or plot a graph representing the user's condition over time where the colors green, yellow, and red represents no stress, moderate stress, and high stress, respectively. The following source code represents an example analytics function 272 for the stress assessment application:

```
%    condition is function of metrics, threshold for when condition
true
%    inputs must have same length and be taken over same time span
%      %    baseline could be based partially on age input
%    max HR = 220–age
%    max HRV decreases with age
%    use deviation from baseline
function condition = ConditionAnalytic(HRV,BR,HR,age)
    t = t/60; % convert t in hours to minutes
    maxBR = 80;
    maxHR = 220 – age;
    if(age < 30) maxHRV = 1/35; end
    if(age >= 30 && age < 40) maxHRV = 1/30; end
    if(age >=40 && age < 50) maxHRV = 1/30; end
    if(age >=50 && age < 60) maxHRV = 1/25; end
    if(age >=60 && age < 70) maxHRV = 1/20; end
    if(age >=70 && age < 80) maxHRV = 1/15; end
    if(age >= 80) maxHRV = 1/10; end
    HRV = 1./HRV;
    HRVnorm = HRV/maxHRV;
    BRnorm = BR/maxBR;
    HRnorm = HR/maxHR;
    a = 6/13;
    b = 6/13;
    c = 1/13;
    condition = a*BRnorm + b*HRnorm + c*(HRVnorm);
%    create separate figure for analytic graph
    figure('Name','Analytic Condition','NumberTitle','off');
    xlabel('time (min)');
    hold on;
%    loop graphs one segment at a time in a color determined by
%    the value of the "condition" variable
    for i = 1:length(condition)–1
%        averages "condition" of two consecutive time points
         avg = (condition(i)+condition(i+1))/2;
%        graphs two points in red, yellow, or green based on "avg"
%        values under .4 are green, considered rest
%        between .4 and .8 are yellow, moderate physiological stress
%        over .8 are red, high physiological stress
         if(avg > .8)
              plot(t(i:i+1),condition(i:i+1),'r');
         end
         if(avg < .8 && avg > .4)
              plot(t(i:i+1),condition(i:i+1),'y');
         end
         if(avg < .4)
              plot(t(i:i+1),condition(i:i+1),'g');
         end
    end
end
```

In this example, analytics program 270 may submit a search query to names database 704 for NDN messages that include at least one of the four required data types. Then, to execute analytics function 272, analytics program 270 may retrieve or derive the heartrate values, breathing rate values, and the heartrate variability values from user data database 702 by querying for the received NDN messages in user data database 702.

In some embodiments, analytics selector 222 can be configured to access names database 704 and/or analytics results database 706 to provide adaptive analytics functionality to the user of cognitive analytics application 700. In some embodiments, analytics selector 222 can be configured to monitor writes to names database 704 or be notified of writes by names database 704. In some embodiments, analytics selector 222 can be configured to share entries, i.e., NDN messages, written to names database 704 to external parties such as external system 130 of FIG. 1. As described above, the NDN messages stored in names database 704 includes metadata of the event data received by data stream receiver 214.

In these embodiments, by transmitting the NDN messages to system 130, analytics selector 222 may notify an authorized stakeholder of system 130 of the existence of a type of user data at cognitive analytics application 700 without transmitting the underlying user data itself (e.g., raw data or actual sensor readings) and therefore protects the user's data privacy. The authorized stakeholder may be an individual such as a physician, a nurse, a dietician, etc. that is authorized by the user to monitor the user's wellbeing. Based on the NDN messages indicating available data streams, the authorized stakeholder may prescribe an analytic analytics program 270, such as an average heart-rate over the past hour, to run on the existing data at the user device. In some embodiments, analytics selector 222 can be configured to retrieve analytics results from analytics results database 706 and transmit them to the authorized stakeholder. For example, after the prescribed average heart rate analytic generates and stores a result in analytics results database 706, analytics selector 222 may report the generated analytics results back to the authorized stakeholder. In some embodiments, analytics selector 222 can be configured to request the user to permit analytics results to be transmitted to the stakeholder. In some embodiments, the NDN messages transmitted to and from cognitive analysis application 700 are configured to be authenticated and authorized according to the NDN access control mechanisms described above with respect to FIG. 7.

Figure 9:
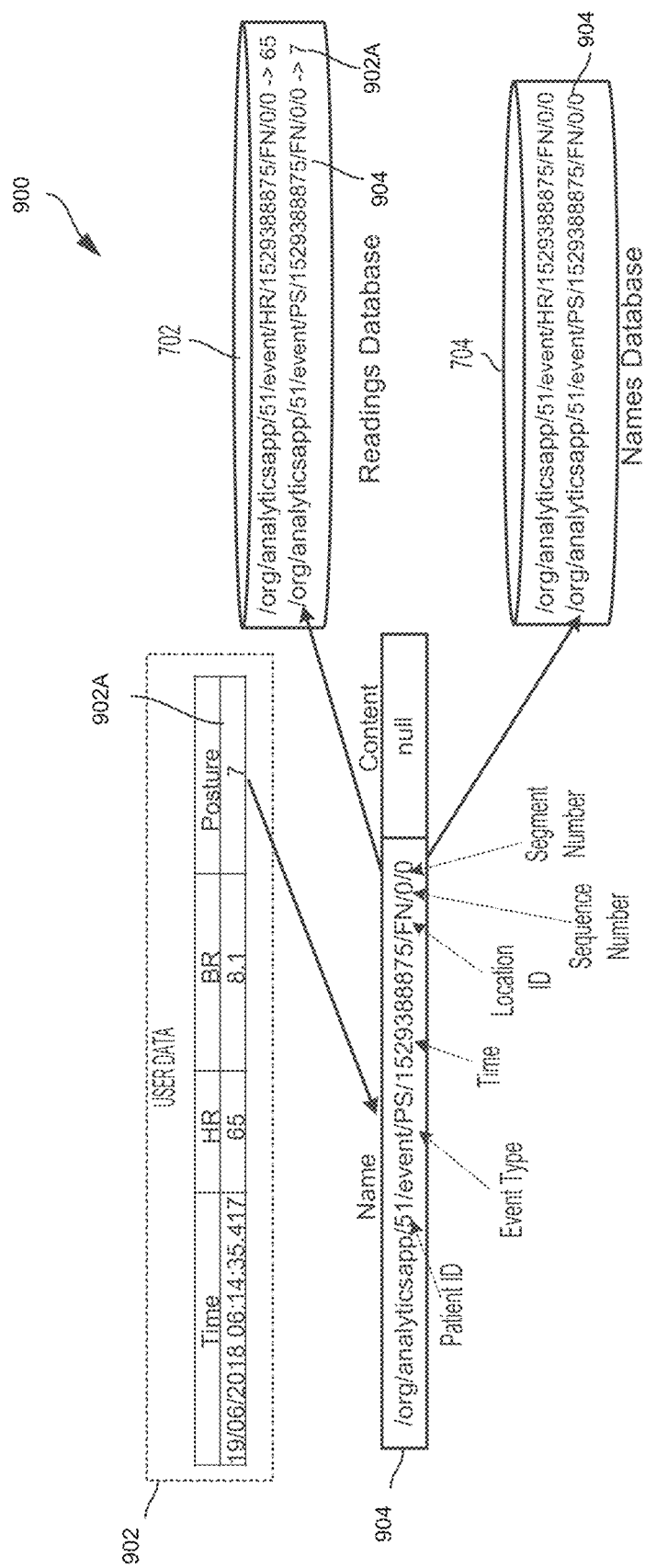
FIG. 9 illustrates a diagram showing an example of applying an NDN name space to collected user data, according to some embodiments.

FIG. 9 illustrates a diagram 900 showing an example of applying an NDN name space 700 to collected user data 902, according to some embodiments. In some embodiments, user data 902 may correspond to user data 116A or user data 250 of FIGS. 1 and 2, respectively. In some embodiments, diagram 900 shows how data stream receiver 214 can apply NDN name space 700 to user data 902 to generate and store NDN messages in user data database 702 and names database 704, as described above with respect to FIG. 7. For ease of reference, the following descriptions may refer to the components of FIGS. 7 and 7.

As shown in diagram 900, user data 902 may include a heartrate ("HR") of 65 beats/minute, a breathing rate ("BR") of 8.1 breaths/minute, and a posture ("PS") value 902A of 7 indicating, e.g., sitting. In some embodiments, data stream receiver 214 may receive posture value 902A from an on-body sensor (e.g., on-body sensor 108B of FIG. 1) and generate an NDN message 904 that comports with NDN name space 700. For example, NDN message 904 may include a patient ID ("51"), an event type ("event/PS"), a time in Linux Epoch format ("1529388875"), a location ID ("FN"), a sequence number ("0"), and a segment number ("0"). As shown, NDN message 904 has no content ("null") corresponding to the posture value 902A. In some embodiments, data stream receiver 214 can store NDN message 804 as an entry in names database 704.

In some embodiments, data stream receiver 214 can be configured to store the underlying data values such as posture value 902A separately from names database 704, as described above with respect to FIG. 7. In some embodiments, data stream receiver 214 can be configured to store an underlying data value (e.g., posture value 902A) in readings database 702 indexed by a corresponding NDN data message (e.g., NDN data message 904).

Figure 3:
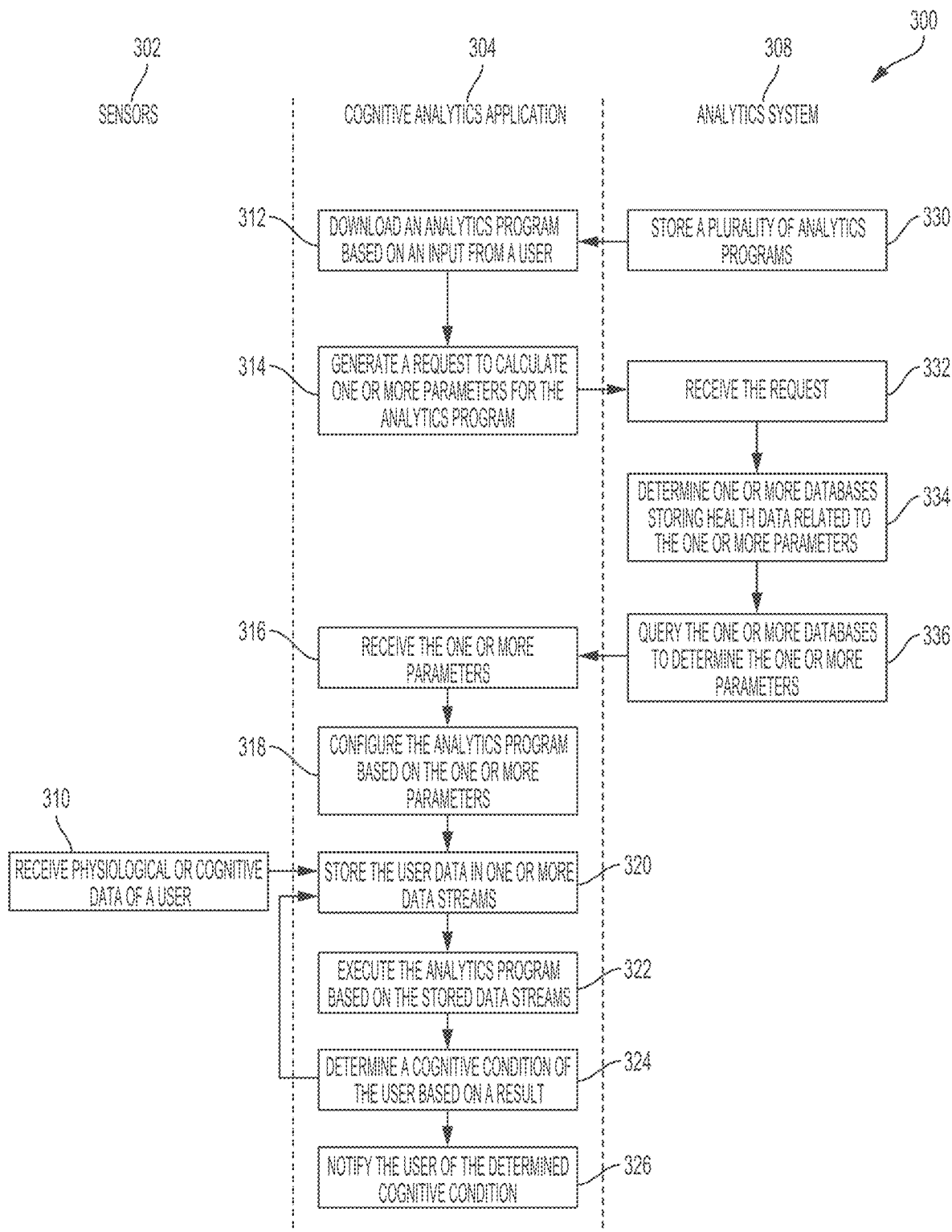
FIG. 3 illustrates a method for providing a cognitive analytics application, according to some embodiments.

FIG. 3 illustrates a method 300 for providing a cognitive analytics application, according to some embodiments. In the example show in method 300, sensors 302, cognitive analytics application 304, and analytics system 308 can correspond to on-body sensors 108A-C, cognitive analytics application 112A, and analytics system 130, respectively, of FIG. 1. In some embodiments, cognitive analytics application 304 corresponds to cognitive analytics application 202 of FIG. 2. Accordingly, one or more of the steps below may reference various components of FIGS. 1 and 2. Method 300 can be performed by a computing system with one or more processors and a memory (e.g., the computing system 900 illustrated in FIG. 9). Method 300 may be included in one or more programs stored in the memory that, when executed by the one or more processors, cause the one or more processors to perform method 300.

In step 330, analytics system 308 (e.g., analytics node 134A) stores a plurality of analytics programs. For example, the plurality of analytics programs can be stored in an analytics repository (e.g., analytics repository 150).

In step 312, cognitive analytics application 304 downloads an analytics program based on an input from a user operating cognitive analytics application 304. For example, the user may be operating a mobile device (e.g., mobile device 110A) that implements cognitive analytics application 304. In some embodiments, the user operating cognitive analytics application 304 may be prescribed the analytics program by another user. In these embodiments, the user may be provided a link to the analytics program stored in step 330. For example, in a medical context, the user may be a patient who is prescribed analytics program by a physician and the prescribed analytics program may be related to a health condition of the patient.

In step 314, cognitive analytics application 304 generates a request to calculate one or more parameters (e.g., function parameters 274) for the analytics program. In some embodiments, the one or more parameters may be used by cognitive analytics application 304 to set baseline measurements specific to the user, as will be further described below. For example, example parameters that may change how analytics program is to be configured may include, without limitation, a height of the user, a gender of the user, a weight of the user, genetics data of the user, a family history of the user, a health status of the user, current prescriptions associated with the user, or other information stored in an EHR (e.g., EHR 162).

In step 332, analytics system 308 receives the request from cognitive analytics application 304 to calculate the one or more parameters. In some embodiments, the request includes a reference identifying the analytics program downloaded in step 312.

In step 334, analytics system 308 determines one or more databases storing health data related to the one or more parameters. In some embodiments, analytics system 308 can determine the type of health data related to the one or more parameters based on the reference identifying the analytics program. In some embodiments, analytics system 308 can query a data source registry (e.g., data source registry 152) to identify which analytics node in analytics system 308 is configured to manage the one or more determined databases.

In step 336, analytics system 308 queries the one or more determined databases to determine the one or more parameters for the user. In some embodiments, analytics system 308 can generate a database query to the identified analytics node to retrieve the one or more parameters. In step 316, cognitive analytics application 304 receives the one or more parameters.

In step 318, cognitive analytics application 304 configures the analytics program based on the one or more parameters. For example, the analytics program may be configured to operate different algorithms depending on the one or more parameters or the analytics program may be initialized based on the one or more parameters.

In step 310, sensors 302 (e.g., on-body sensors 108A-C) receive physiological or cognitive data of a user. For example, a sensor may be a vitals sensor for detecting physiological data of the user such as a body temperature, a blood pressure, a pulse (i.e., heart rate), or a breathing rate (i.e., a respiratory rate). For example, a sensor may include a user interface of the mobile device that is configured to request the user to complete cognitive tests (e.g., generated by cognitive test generator 216) used to detect the user's cognitive state. In some embodiments, each sensor can be configured to receive one or more types of user data.

In step 320, cognitive analytics application 304 stores the user data in one or more data streams. In some embodiments, each data stream can be configured to store one data type of one of sensors 302. In some embodiments, each data stream can be configured to store one data type from two or more of sensors 302. In some embodiments, the one or more data streams can be stored as a plurality of NDN messages that comports with NDN name space 700 of FIG. 7. In some embodiments, cognitive analytics application 304 can convert each user datum into an NDN message that stores metadata of the user datum. Then, cognitive analytics application 304 can store the generated NDN message in a names database, as described above with respect to FIGS. 7-9.

In step 322, cognitive analytics application 304 executes the analytics program based on the one or more stored data streams. As described above, the analytics program may be selected to monitor one or more health status of the user. In some embodiments, cognitive analytics application 304 can be configured to retrieve data stream types (e.g., data stream types 264) and data requirements (e.g., data requirements 266) associated with the analytics program from analytics program metadata (e.g., analytics program metadata 260) stored on cognitive analytics application 304. In some embodiments, cognitive analytics application 304 can be configured to issue requests to a names database for NDN messages that match one or more of data stream types (e.g., data stream types 264) to retrieve the needed user data to perform the analytic, as described above with respect to FIG. 7.

In step 324, cognitive analytics application 304 determines a cognitive condition of the user based on a result of executing the analytics program in step 322. In some embodiments, cognitive analytics application 304 can be configured to generate one or more metrics from the one or more stored data streams. Then, cognitive analytics application 304 can compare the one or more generated metrics against one or more thresholds to determine the cognitive condition. In some embodiments, cognitive analytics application 304 can determine a presence of an anomaly by comparing the one or more stored data streams against a baseline profile generated according to the one or more parameters. In some embodiments, the analytic program can configure the one or more thresholds based on the one or more parameters received from analytics system 308 in step 316. Accordingly, these thresholds may be set specifically for the user operating cognitive analytics application 304.

In step 326, cognitive analytics application 304 notifies the user of the determined cognitive condition. In some embodiments, cognitive analytics application 304 can be configured to alert the user based on a sound, a text message, a vibration, an email, a visual display, or other means. For example, if the analytics program is a medical application for monitoring a medical condition, an example notification provided by cognitive analytics application 304 to the user may be an email or text requesting the user to schedule an appointment with a physician associated with analytic system 130 to assess the determined cognitive condition. In some embodiments, cognitive analytics application 304 can be configured to transmit the determined cognitive condition or a result of the analytics program to analytics system 308. After receipt of such information, analytics system 308 may notify the physician (e.g., user of operator device 170) of the user's cognitive condition, as described above with respect to FIG. 7.

Figure 4:
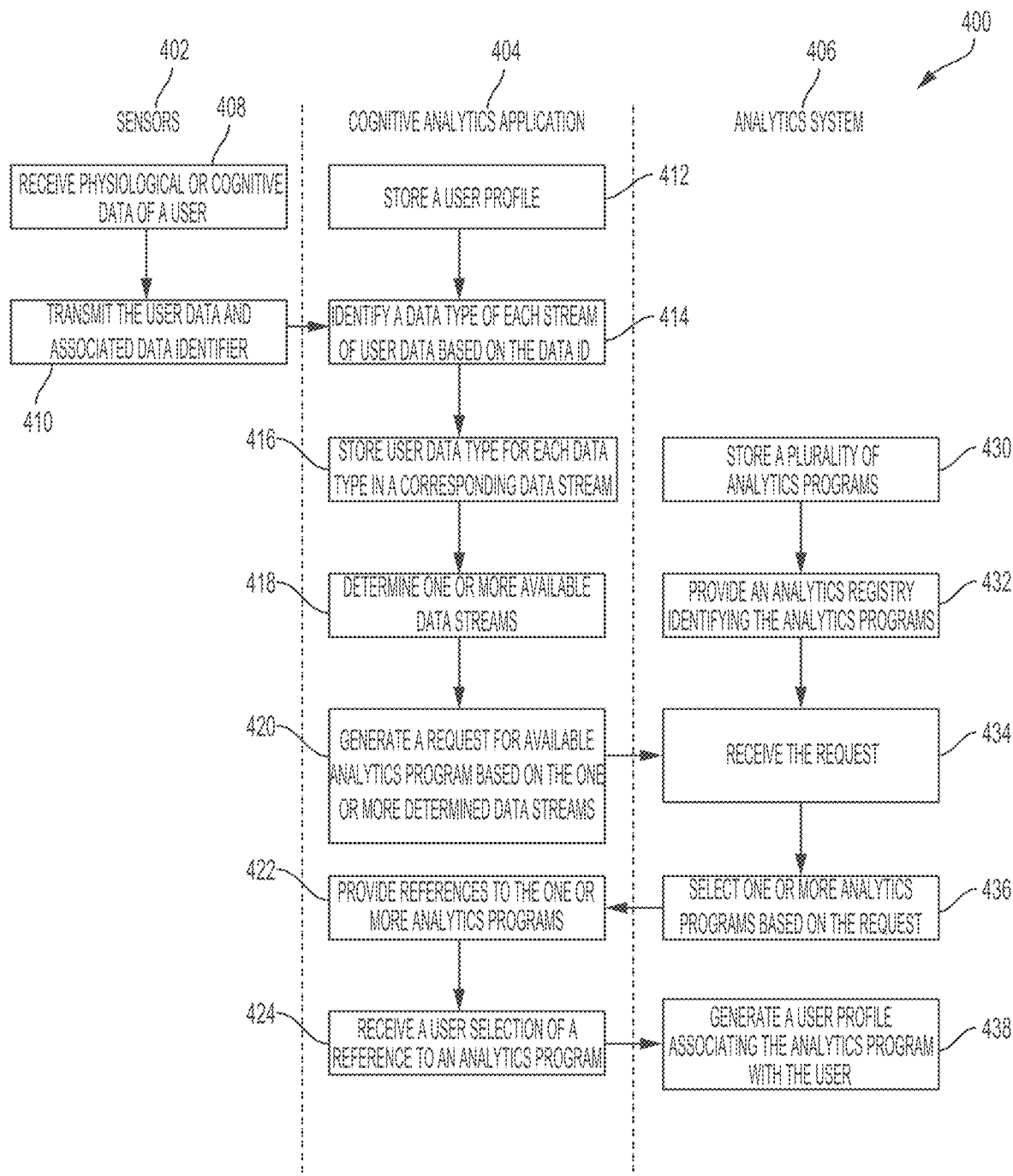
FIG. 4 illustrates a method for providing analytics adaptive to available data streams, according to some embodiments.

FIG. 4 illustrates a method 400 for providing analytics adaptive to available data streams, according to some embodiments. In the example show in method 400, sensors 402, cognitive analytics application 404, and analytics system 408 can correspond to on-body sensors 108A-C, cognitive analytics application 112A, and analytics system 130, respectively, of FIG. 1. In some embodiments, cognitive analytics application 404 corresponds to cognitive analytics application 202 of FIG. 2. Accordingly, one or more of the steps below may reference various components of FIGS. 1 and 2. Method 400 can be performed by a computing system with one or more processors and a memory (e.g., the computing system 900 illustrated in FIG. 9). Method 400 may be included in one or more programs stored in the memory that, when executed by the one or more processors, cause the one or more processors to perform method 400.

In step 408, sensors 402 receive physiological or cognitive data of a user. In some embodiments, sensors 402 may include an on-body sensor separate from the mobile device (e.g., mobile device 110A) operating cognitive analytics application 404. In some embodiments, sensors 402 may include components of the mobile device such as a microphone, a camera, or a user interface of cognitive analytics application 404 configured to generate cognitive survey data or cognitive test data based on user input. In step 410, sensors 402 transmit the user data and associated data identifier (ID) to cognitive analytics application 404. In some embodiments, each type of user data generated at a sensor may be associated with a corresponding data ID to enable cognitive analytics application 404 to determine a data stream type (e.g., data stream type 242) for the user data.

In step 412, cognitive analytics application 404 stores a user ID associated with the user operating cognitive analytics application 404. In some embodiments, cognitive analytics application 404 may store a device ID identifying the mobile device operating cognitive analytics application 404. In some embodiments, the user ID may be a unique identifier such as a username.

In step 414, cognitive analytics application 404 identifies a data type (e.g., data stream type 242) of each stream of user data from each sensor based on the data ID. In step 416, cognitive analytics application 404 stores user data for each data type in a corresponding data stream. In some embodiments, the stored data stream (e.g., user data 250) can be associated with a geotemperal tag (e.g., geotemperal indicator 251). In some embodiments, cognitive analytics application 404 can be configured to update data stream metadata (e.g., data stream metadata 240) to indicate that cognitive analytics application 404 is capable of receiving a data stream of associated with the identified data type. In some embodiments, a data stream can be stored as a plurality of NDN messages in a names database, as described above with respect to FIGS. 7-8.

In step 418, cognitive analytics application 404 determines one or more available data streams receivable at cognitive analytics application 404 based on the information in the data stream metadata. In some embodiments, as additional sensors 402 are added or removed, the types of data streams stored in the data stream metadata can be updated and step 418 may result in one or more different available data streams.

In step 420, cognitive analytics application 404 generates a request for available analytics programs based on the one or more determined data streams of step 418. In some embodiments, instead of explicitly determining the one or more available data streams in step 418, cognitive analytics application 404 can be configured to transmit NDN messages from the names database to analysis system 406, as described above with respect to FIG. 7. In some embodiments, the NDN message itself includes metadata specifying the type of event data available at cognitive analytics application 404.

In step 430, analytics system 406 stores a plurality of analytics programs. In some embodiments, step 430 corresponds to step 330 of FIG. 3. In some embodiments, the plurality of analytics programs can be stored in an analytics repository of one or more analytics nodes in can be stored in an analytics repository of one or more analytics nodes in can be stored in an analytics repository of one or more analytics nodes in analytics system 406.

In step 432, analytics system 406 provides an analytics registry (e.g., analytics registry 148) identifying the analytics programs stored in step 430. In some embodiments, when a new analytics program is stored in analytics system 406, analytics system 406 can be configured to add a new entry to the analytics registry. Similarly, when an existing analytics program is updated or removed, analytics system 406 can be configured to modify or remove the corresponding entry in the analytics registry. In some embodiments, each entry in the analytics register can include a reference to an analytics program and data requirements to operate the analytics program such as one or more required data streams and associated data restrictions.

In step 434, analytics system 406 receives the request for analytics programs from cognitive analytics application 404. In some embodiments, analytics system 406 receives a plurality of NDN messages.

In step 436, analytics system 406 selects one or more analytics programs from the analytics registry based on the request. In some embodiments, analytics system 406 can be configured to select the one or more analytics programs based on the plurality of received NDN messages. In some embodiments, analytics system 406 can be configured to query the analytics registry to select a set of analytics programs whose data stream requirements matches the one or more available data streams receivable at cognitive analytics application 404, as described above in step 418. In some embodiments, the set of analytics programs may correspond to the one or more selected analytics programs. In some embodiments, analytics system 406 can transmit references to the one or more selected analytics programs to cognitive analytics application 404.

In some embodiments, the request generated in step 420 can include user information such as user ID of step 412 associated with the user. In these embodiments, analytics system 406 can be configured to select a subset (e.g., a second set) of the set (e.g., a first set) of analytics programs based on the user information. In some embodiments, analytics system 406 can be configured to query an EHR (e.g., EHR 162) based on the user information to assess a medical condition of the user. Based on the assessment, analytics system 406 can be configured to select one or more analytics programs from the set of selected analytics programs as being more relevant to the user. For example, if analytics system 406 determines that the user has a high risk for developing depression and heart disease, analytics system 406 may select analytics programs related to depression or heart disease.

In step 422, cognitive analytics application 404 provides the references to the one or more analytics programs to the user. In some embodiments, a user interface (e.g., user interface 226) in cognitive analytics application 404 can be configured to display the references as suggested analytics programs to the user.

In step 424, cognitive analytics application 404 receives a user selection of a reference to an analytics program. In some embodiments, the user interface of cognitive analytics application 404 can be configured to receive the user selection. In some embodiments, upon receiving the user selection, cognitive analytics application 404 can be configured to download the analytics program, as described with respect to step 312 of FIG. 3. In some embodiments, cognitive analytics application 404 can transmit the user selection to analytics system 406.

In step 438, analytics system 406 can be configured to generate a user profile associating the analytics program with the user. In some embodiments, the user profile may be stored in, for example, an EHR (e.g., EHR 162). By storing selected analytics programs, analytics system 406 may enable cognitive analytics application 404 to offload processing as well as to notify the user of updates to the analytics program.

In one or more examples, the process in which a request is made for an analytics program by the cognitive analytics application 418 and fulfilled by the analytics system 406 described above with respect to steps 418, 420, 422, 434, and 436, can be implemented using one or more domain-specific communications protocols configured specifically to allow for the sharing of analytics in a distributed analytics network in a manner that does not compromise the privacy of the underlying data used by the analytics. In or more examples, the communications protocol configured to standardize analytic exchanges as described above with respect to FIG. 4 can be implemented so as to standardize interactions between nodes that communicate with one another to facilitate the analytic exchange.

In one or more examples of the disclosure, the systems and methods described herein can utilize the IEEE P2795 standard to implement the communications protocol described above. The P2795 standard can identify the requirements for using shared analytics over secured and unsecured networks. It can establish a consistent method of using an overarching interoperability framework to utilize one or more disparate data systems for analytic purposes without an analytic user having explicit access to or sharing the data within these systems.

Figure 5A:
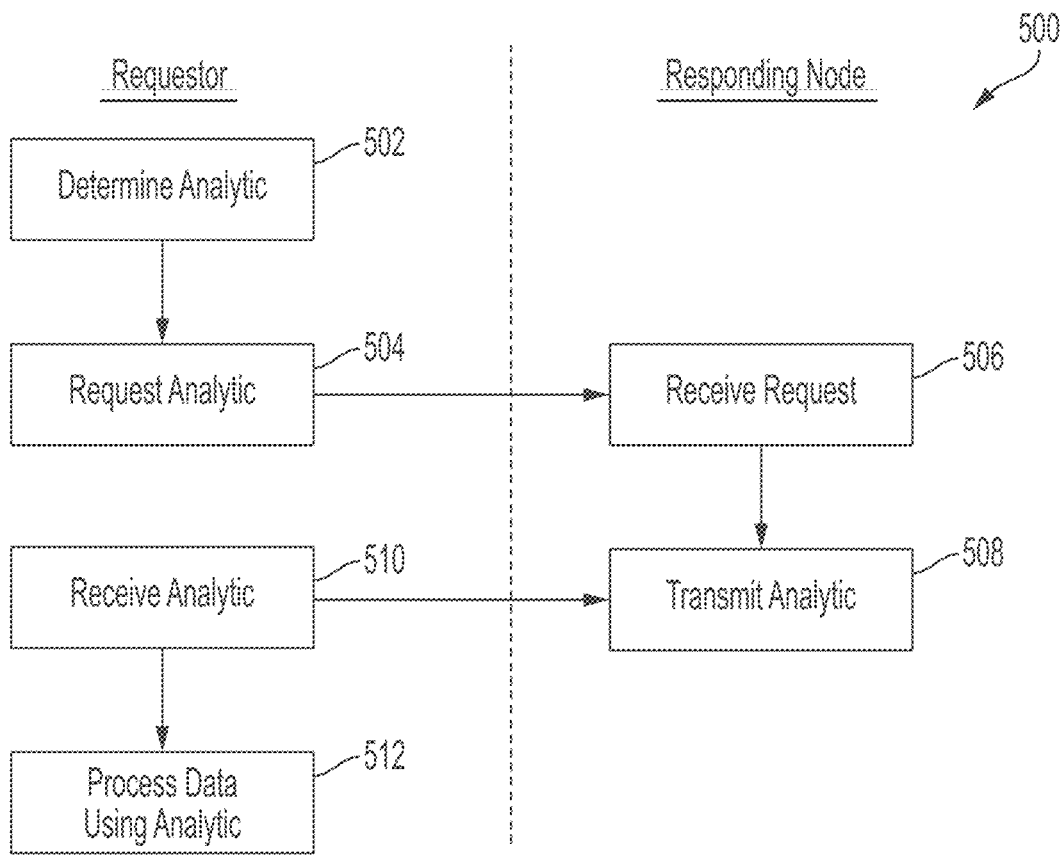
FIG. 5A illustrates an exemplary analytic exchange process implemented using a standardized communications protocol according to examples of the disclosure.

FIG. 5A illustrates an exemplary analytic exchange process implemented using a standardized communications protocol according to examples of the disclosure. In one or more examples, the process 500 of FIG. 5A can begin at step 502 wherein a requesting node, which in the example of FIG. 5A can include the device requesting a particular analytic, determines the type of analytic desired. In one or more examples, the determination of the type of analytic desired can be based on the type of data available to the requesting node, similar to the example described above with respect to step 420 of FIG. 4. Once the desired analytic has been determined at step 502, the process 500 can move to step 504 wherein the requesting node can send a request to the responding node, specifically requesting the analytic. In one or more examples, the request can be transmitted using the P2795 standard, so as to standardize the interaction between the requesting node and the responding node. In this way, the requesting does not need to have a priori knowledge of any specific application-program interfaces of the responding node and can instead utilized a standardized communications protocol such as IEEE P2795.

In one or more examples, after the request is transmitted by the requesting node at step 504 and received by the responding node at step 506, the responding node can transmit the requested analytic to the requesting node at step 508. The transmission of the analytic at step 508 can be in accordance with the standardized communications protocol such as P2795 as described above. In one or more examples of the disclosure, the analytic to be transmitted can be vetted prior to transmission to ensure that it meets the specific security requirements specified by a standard such as P2795 so as to ensure that any data transmitted between the requesting node and the responding node maintains the privacy of the underlying data analyzed by the analytic.

In one or more examples, once the analytic is transmitted by the responding node at step 508, the process 500 can move to step 510 wherein the analytic is received by the requesting node. Once the analytic is received at step 510, the process 500 can move to step 512 wherein the data stored in the requesting node can be processed using the received analytic from the responding node. As shown in the example of FIG. 5A, the communications protocol/standard can work to standardize communications between requesting nodes and responding nodes in a distributed analytics framework such that the underlying data (i.e., patient data) is not made vulnerable to unintended disclosure to a malicious user, and instead the analytic tool or algorithm itself is what is being transferred between devices or nodes in the distributed analytics platform.

In the example above of FIG. 5A, the requesting node had possession of the data and requested the analytic needed to process that data. However, in one or more examples, the requesting node can instead be in possession of an analytic, and send requests to various nodes to find a data set that matches the needs of the analytic to be performed. In other words, instead of a requesting node searching for an analytic to process its data, the requesting node searches for data to be processed by the analytic is already possesses.

Figure 5B:
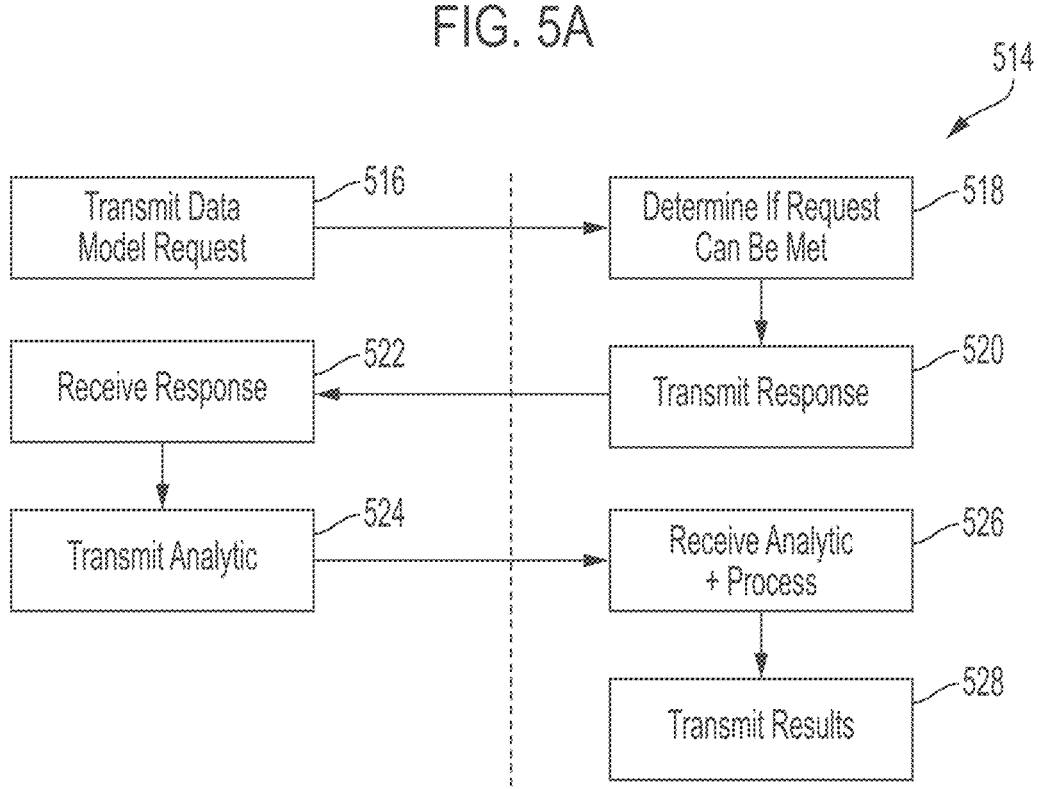
FIG. 5B illustrates another exemplary analytic exchange process implemented using a standardized communications protocol according to examples of the disclosure.

FIG. 5B illustrates another exemplary analytic exchange process implemented using a standardized communications protocol according to examples of the disclosure. In one or more examples, the process 514 of FIG. 5B can begin at step 516 wherein the requesting node, which has one or more analytics stored in its memory, transmits a data model request to one or more potential responding nodes. Similar to the example of FIG. 5A, the request node can format the request using a standardized communications protocol such as IEEE P2795. In the example of FIG. 5B, the communications protocol can use standardized syntax configured to articulate the type of data needed to perform a certain analytic as well as the computing requirement to perform the analytic.

In one or more examples of the disclosure, once the requesting node transmits a data model request at step 516, the process 514 can move to step 518 wherein the responding node can received the request and determine if the request can be met. If it is determined at step 518, the process 514 can move to step 520 wherein the responding node transmits a response to the requesting node indicating that it possesses the requested data model, and also has the computing capacity needed by the analytic stored on the requesting node. At step 522, the requesting node can receive the response from the responding node, and the process 514 can move to step 524 wherein the requesting node transmits the analytic to the responding node. Once the analytic has been transmitted by the requesting node at step 524, the process 514 can move to step 526 wherein the responding node receives the analytic and process the data using the analytic. Finally once the data has been processed at step 526, the process 514 can move to step 528 wherein the results of the processing are transmitted to the requesting node.

The examples of FIGS. 5A and 5B show that whether the requesting node possess data in search of an analytic, or possess an analytic in search of data, a standardized communications protocol specifically configured to accommodate or implement distributed analytics can facilitate efficient and safe processing of the data while maintain data privacy.

Figure 6:
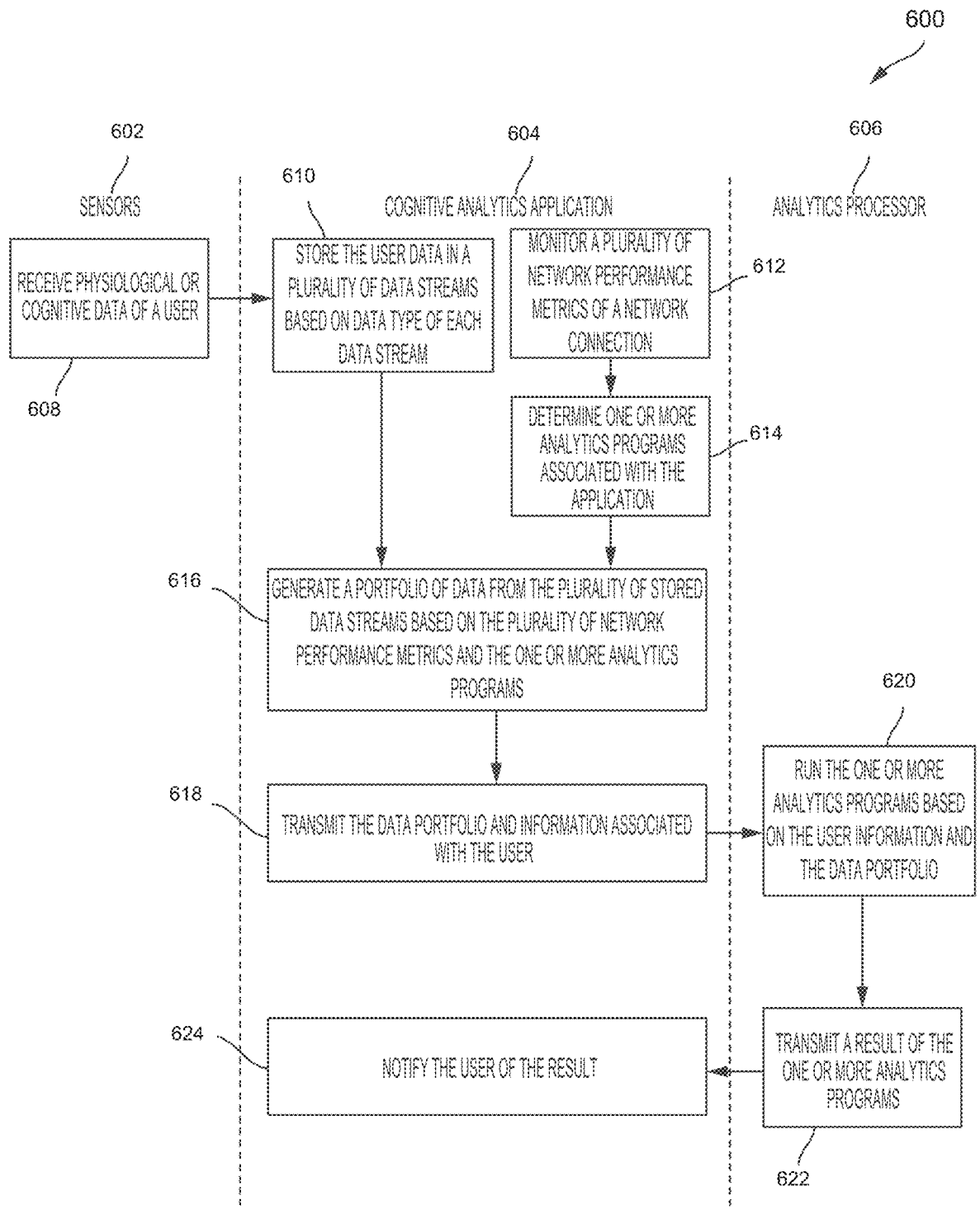
FIG. 6 illustrates a method for providing data streams adaptive to network conditions, according to some embodiments.

FIG. 6 illustrates a method 600 for providing data streams adaptive to network conditions, according to some embodiments. In the example show in method 600, sensors 602 and cognitive analytics application 604 can correspond to on-body sensors 108A-C and cognitive analytics application 112A and analytics processor 606 can correspond to processing device 113 or analytics node 134A of FIG. 1. In some embodiments, cognitive analytics application 604 corresponds to cognitive analytics application 202 of FIG. 2. Accordingly, one or more of the steps below may reference various components of FIGS. 1 and 2. Method 600 can be performed by a computing system with one or more processors and a memory (e.g., the computing system 1000 illustrated in FIG. 10). Method 600 may be included in one or more programs stored in the memory that, when executed by the one or more processors, cause the one or more processors to perform method 600.

In step 608, sensors 402 receive physiological or cognitive data of a user. In some embodiments, step 608 corresponds to step 408 of FIG. 4.

In step 610, cognitive analytics application 604 stores the user data in a plurality of data streams based on a data type of each data stream. In some embodiments, step 610 corresponds to steps 414 and 416, in which the data type of the user data can be determined and stored in a corresponding data stream.

In step 612, cognitive analytics application 604 monitors a plurality of network performance metrics of network connection between cognitive analytics application 604 and analytics processor 606. In some embodiments, the plurality of network performance metrics includes a bandwidth, a throughput, latency, a jitter, an error rate, or a combination thereof.

In step 614, cognitive analytics application 604 determines one or more analytics programs associated with cognitive analytics application 604. In some embodiments, the determined one or more analytics programs corresponds to analytics programs running on cognitive analytics application 604. In some embodiments, cognitive analytics application 604 determines the one or more analytics programs based on analytics program metadata (e.g., analytics program metadata 260). In some embodiments, the analytics program metadata may include references to one or more analytics program being executed (i.e., offloaded) by a remote device (e.g., analytics processor 606) separate from the mobile device implementing cognitive analytics application 604.

In step 616, cognitive analytics application 604 generates a portfolio of data from the plurality of stored data streams based on the plurality of network performance metrics and the one or more determined analytics programs. In some embodiments, the data portfolio can include portions from each data stream of the plurality of stored data streams. In some embodiments, the portions to select from each data stream may be determined based on a priority or selection associated with a data stream type of the data stream, as described above with respect to FIG. 2. Accordingly, by varying which of the data streams and how much of each data stream to include in the data portfolio, cognitive analytics application 604 may be capable of reducing the impact that poor network performance (e.g., poor network connectivity or overloaded network connection) may have on processing high-priority user data.

In step 618, cognitive analytics application 604 transmits the generated data portfolio and information associated with the user to analytics processor 606. In some embodiments, the user information may include a user ID associated with the user operating cognitive analytics application 604.

In step 620, analytics processor 606 runs the one or more analytics programs based on the user information and the data portfolio of step 618. In some embodiments, analytics processor 606 can be configured to identify the one or more analytics programs based on the user information. For example, analytics processor 606 may query a database of user profiles based on the user information to identify the one or more analytics programs associated with the user.

In step 622, analytics processor 606 transmits a result of the one or more analytics programs. In some embodiments, the result may correspond to a result of executing an analytics program at cognitive analytics application 404, which is described with respect to steps 322 and 324 of FIG. 3.

In some embodiments, analytics processor 606 can be a remote device (e.g., processing device 113) capable of receiving and processing user-derived data from a plurality of cognitive analytics application 604 operated by a plurality of corresponding users. In these embodiments, an analytic program run by analytics processor 606 can include a monitor component (e.g., monitor component 117) that compares user-derived data from different users and displays comparisons or analysis of compared user-derived data to a user operating analytics processor 606.

In step 624, cognitive analytics application 604 notifies the user of the result from analytics processor 606. In some embodiments, the notification may correspond to that described in step 326 of FIG. 3.

Figure 10:
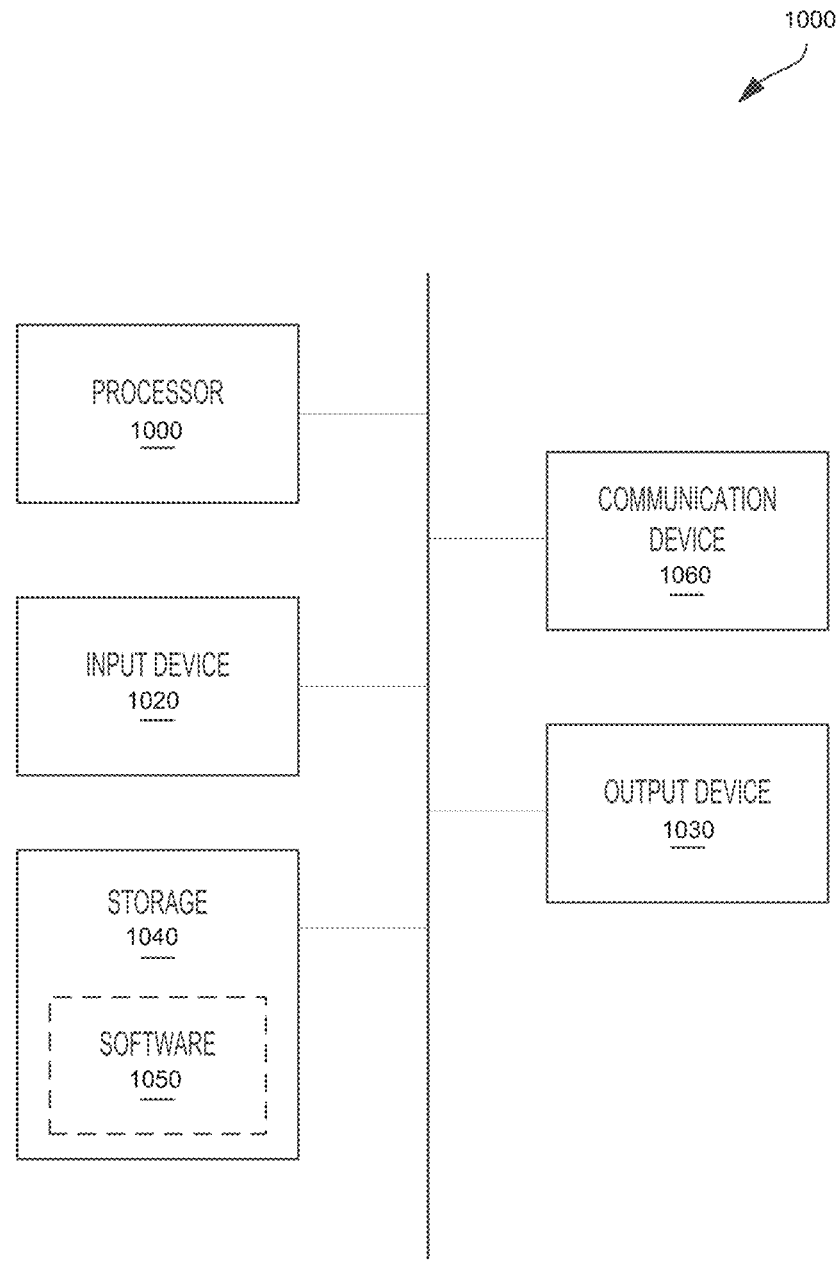
FIG. 10 illustrates an example of a computing device in accordance with one embodiment.

FIG. 10 illustrates an example of a computer in accordance with some embodiments. Computer 1000 can be a component of a system for providing an adaptive cognitive analytics platform according to the systems and methods described above, such as components of system 100 of FIG. 1, or can include the entire system itself. In some embodiments, computer 1000 is configured to execute methods 300-500 as described with respect to FIGS. 3-6.

Computer 1000 can be a host computer connected to a network. Computer 1000 can be a client computer or a server. As shown in FIG. 10, computer 1000 can be any suitable type of microprocessor-based device, such as a personal computer, workstation, server, or handheld computing device, such as a phone or tablet. The computer can include, for example, one or more of processor 1010, input device 1020, output device 1030, storage 1040, and communication device 1060. Input device 1020 and output device 1030 can correspond to those described above and can either be connectable or integrated with the computer.

Input device 1020 can be any suitable device that provides input, such as a touch screen or monitor, keyboard, mouse, or voice-recognition device. Output device 1030 can be any suitable device that provides an output, such as a touch screen, monitor, printer, disk drive, or speaker.

Storage 1040 can be any suitable device that provides storage, such as an electrical, magnetic, or optical memory, including a random access memory (RAM), cache, hard drive, CD-ROM drive, tape drive, or removable storage disk. Communication device 1060 can include any suitable device capable of transmitting and receiving signals over a network, such as a network interface chip or card. The components of the computer can be connected in any suitable manner, such as via a physical bus or wirelessly. Storage 1040 can be a non-transitory computer-readable storage medium comprising one or more programs, which, when executed by one or more processors, such as processor 1010, cause the one or more processors to execute methods described herein, such as methods 300-500 of FIGS. 3-5.

Software 1050, which can be stored in storage 1040 and executed by processor 1010, can include, for example, the programming that embodies the functionality of the present disclosure (e.g., as embodied in the systems, computers, servers, and/or devices as described above). In some embodiments, software 1050 can include a combination of servers such as application servers and database servers.

Software 1050 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A system for providing cognitive assistive analytics, comprising:
   a plurality of on-body sensors configured to collect information pertaining to a user;
   an electronic display that displays notification messages for the user;
   one or more processors; memory; and one or more programs stored on the memory that when executed by the one or more processors cause the one or more processors to:
   download, from a repository in an analytics system at a remote server, an analytics program to an analytics application based on a selection from a user;
   transmit, from the analytics application, a request comprising an identifier to the analytics system at the remote server to determine one or more parameters associated with health data of the user, wherein the one or more parameters are determined by the analytics system using one or more databases that store health data of the user based on the identifier;
   receive, by the analytics application, the one or more determined parameters from the analytics system;
   configure, using the analytics application, the analytics program based on the one or more determined parameters to perform cognitive analytics;
   transmit, from the analytics application, at least one of a detection rate, a storage rate, and a transmission rate to at least one of the plurality of on-body sensors assigning the at least one of the detection rate, the storage rate, and the transmission rate to the at least one of the plurality of on-body sensors based on a data stream type of the at least one of the plurality of on-body sensors and at least one network parameter;

receive and store the collected information pertaining to the user from the plurality of on-body sensors, wherein the collected information includes data from the at least one of the plurality of on-body sensors that is detected, stored, and/or transmitted based on the at least one of the detection rate, the storage rate, and the transmission rate assigned to the at least one of the plurality of on-body sensors;

execute the configured analytics program using the collected information pertaining to the user received from the plurality of on-body sensors, in conjunction with the one or more determined parameters received from the analytics system;

determine a cognitive condition of the user based on a result of executing the configured analytics program; and transmit and display on the electronic display a message to notify the user of the determined cognitive condition.

2. The system of claim 1, wherein to notify the user, the one or more processors are caused to:
request the user to schedule an appointment with a physician to assess the determined cognitive condition.

3. The system of claim 1, wherein the determined cognitive condition indicates whether an anomaly is present.

4. The system of claim 1, wherein the collected information pertaining to the user comprises physiological data, cognitive survey data, cognitive test data, and analytics metrics.

5. The system of claim 1, wherein the collected information pertaining to the user comprises cognitive survey data, and wherein the one or more processor are caused to:
generate a cognitive survey including a predetermined question related to a cognitive state of the user;
display, in a user interface, the cognitive survey to the user; and
receive, in the user interface, an input from the user that answers the predetermined question in the cognitive survey, wherein the user input comprises cognitive survey data.

6. The system of claim 1, wherein the collected information pertaining to the user comprises cognitive test data, and wherein the one or more processor are caused to:
generate a cognitive test that requires the user to perform a task on a display;
display, in a user interface, the cognitive test to the user;
receive, in the user interface, an input from the user associated with performing the task; and
generate the cognitive test data based on the user input.

7. The system of claim 1, wherein the collected information pertaining to the user comprises physiological data comprising one or more of a gait-stride time, a heart rate, a heart rate variability (HRV), a blood pressure (BP), a body temperature, a galvanic skin response, or an electrocardiogram (ECG), a breathing rate, posture data, or an acceleration.

8. The system of claim 1, wherein an on-body sensor of the plurality of on-body sensors comprises a light sensor, a biosensor, a microphone, or a temperature sensor.

9. The system of claim 1, wherein the one or more processors are caused to:
receive geolocation information from a Global Positioning System (GPS) device;

determine a data stream type of user data received from an on-body sensor of the plurality of on-body sensors;
store the user data in a data stream associated with the determined data stream type; and
tag the user data in the data stream with the geolocation information.

10. A method for providing cognitive assistive analytics, comprising:
collecting information pertaining to a user from a plurality of on-body sensors;
downloading, from a repository in an analytics system at a remote server, an analytics program to an analytics application based on a selection from a user;
transmitting, from the analytics application, a request comprising an identifier to the analytics system at the remote server to determine one or more parameters associated with health data of the user, wherein the one or more parameters are determined by the analytics system using one or more databases that store health data of the user based on the identifier;
receiving, by the analytics application, the one or more determined parameters from the analytics system;
configuring, using the analytics application, the analytics program based on the one or more determined parameters to perform cognitive analytics;
transmitting, from the analytics application, at least one of a detection rate, a storage rate, and a transmission rate to at least one of the plurality of on-body sensors
assigning the at least one of the detection rate, the storage rate, and the transmission rate to the at least one of the plurality of on-body sensors based on a data stream type of the at least one of the plurality of on-body sensors and at least one network parameter;
receiving and storing the collected information pertaining to the user from the plurality of on-body sensors, wherein the collected information includes data from the at least one of the plurality of on-body sensors that is detected, stored, and/or transmitted based on the at least one of the detection rate, the storage rate, and the transmission rate assigned to the at least one of the plurality of on-body sensors;
executing the configured analytics program using the received collected information pertaining to the user and the received one or more determined parameters from the analytics system;
determining a cognitive condition of the user based on a result of executing the configured analytics program; and
transmitting and displaying on an electronic display a message to notify the user of the determined cognitive condition.

11. The method of claim 10, wherein notifying the user comprises:
requesting the user to schedule an appointment with a physician to assess the determined cognitive condition.

12. The method of claim 10, wherein the determined cognitive condition indicates whether an anomaly is present.

13. The method of claim 10, wherein the collected information pertaining to the user comprises physiological data, cognitive survey data, cognitive test data, and analytics metrics.

14. The method of claim 10, wherein the collected information pertaining to the user comprises cognitive survey data, and wherein the method comprises:
generating a cognitive survey including a predetermined question related to a cognitive state of the user;

displaying, in a user interface, the cognitive survey to the user; and receiving, in the user interface, an input from the user that answers the predetermined question in the cognitive survey, wherein the user input comprises cognitive survey data.

15. The method of claim 10, wherein the collected information pertaining to the user comprises cognitive test data, and wherein the method comprises:

generating a cognitive test that requires the user to perform a task on a display;

displaying, in a user interface, the cognitive test to the user;

receiving, in the user interface, an input from the user associated with performing the task; and generating the cognitive test data based on the user input.

16. The method of claim 10, wherein the collected information pertaining to the user comprises physiological data comprising one or more of a gait-stride time, a heart rate, a heart rate variability (HRV), a blood pressure (BP), a body temperature, a galvanic skin response, or an electrocardiogram (ECG), a breathing rate, posture data, or an acceleration.

17. The method of claim 10, wherein an on-body sensor of the plurality of on-body sensors comprises a light sensor, a biosensor, a microphone, or a temperature sensor.

18. The method of claim 10, comprising:

receiving geolocation information from a Global Positioning System (GPS) device;

determining a data stream type of user data received from an on-body sensor of the plurality of on-body sensors;

storing the user data in a data stream associated with the determined data stream type; and tagging the user data in the data stream with the geolocation information.

* * * * *